United States Patent
Chang

(10) Patent No.: US 8,227,370 B2
(45) Date of Patent: Jul. 24, 2012

(54) HIGH ACTIVITY CATALYST COMPONENT FOR OLEFIN POLYMERIZATION AND METHOD OF USING THE SAME

(75) Inventor: Main Chang, Houston, TX (US)

(73) Assignee: BASF Corporation, Florham Park, NJ (US)

( * ) Notice: Subject to any disclaimer, the term of this patent is extended or adjusted under 35 U.S.C. 154(b) by 0 days.

(21) Appl. No.: 12/943,512

(22) Filed: Nov. 10, 2010

(65) Prior Publication Data

US 2012/0116031 A1 May 10, 2012

(51) Int. Cl.
- C08F 4/60 (2006.01)
- C08F 2/00 (2006.01)
- B01J 31/00 (2006.01)

(52) U.S. Cl. ........ 502/127; 502/118; 502/125; 502/150; 502/172; 526/208; 526/213

(58) Field of Classification Search ............... 526/123.1, 526/142, 208, 213; 502/118, 125, 127, 150, 502/170, 172

See application file for complete search history.

(56) References Cited

U.S. PATENT DOCUMENTS

| | | | |
|---|---|---|---|
| 4,771,023 A | 9/1988 | Sasaki et al. | |
| 4,784,983 A | 11/1988 | Mao et al. | |
| 4,829,038 A | 5/1989 | Hoppin et al. | |
| 4,861,847 A | 8/1989 | Mao et al. | |
| 4,990,479 A | 2/1991 | Ishimaru et al. | |
| 5,177,043 A | 1/1993 | Koyama et al. | |
| 5,194,531 A | 3/1993 | Toda et al. | |
| 5,208,302 A * | 5/1993 | Nakajo et al. | 526/125.3 |
| 5,244,989 A | 9/1993 | Hara et al. | |
| 5,438,110 A | 8/1995 | Ishimaru et al. | |
| 5,489,634 A | 2/1996 | Hara et al. | |
| 5,576,259 A | 11/1996 | Hasegawa et al. | |
| 5,767,215 A | 6/1998 | Garoff et al. | |
| 5,773,537 A | 6/1998 | Mueller et al. | |
| 5,905,050 A | 5/1999 | Koshinen et al. | |
| 6,323,152 B1 | 11/2001 | Sacchetti et al. | |
| 6,437,061 B1 | 8/2002 | Sacchetti et al. | |
| 6,469,112 B2 | 10/2002 | Cheng et al. | |
| 6,962,889 B2 | 11/2005 | Zhu et al. | |
| 7,135,531 B2 | 11/2006 | Zhu et al. | |
| 7,153,803 B2 | 12/2006 | Zhu et al. | |
| 7,271,119 B2 | 9/2007 | Denifl et al. | |

(Continued)

OTHER PUBLICATIONS

U.S. Appl. No. 12/655,007, filed Dec. 21, 2009, Chang.

(Continued)

Primary Examiner — David W Wu
Assistant Examiner — Elizabeth Eng
(74) Attorney, Agent, or Firm — Marshall, Gerstein & Borun LLP

(57) ABSTRACT

A catalyst system containing (a) a solid catalyst component containing a titanium halide, a magnesium halide, a first internal electron donor compound, and a second internal electron donor compound, (b) an organoaluminum compound, and (c) an external electron donor compound is disclosed. The first internal electron donor compound contains at least one ether group and at least one ketone group. The second internal electron donor compound is a 1,8-naphthyl diester compound. Methods of polymerizing or copolymerizing alpha-olefins using the catalyst system also are disclosed.

23 Claims, 3 Drawing Sheets

U.S. PATENT DOCUMENTS

| | | | |
|---|---|---|---|
| 2004/0242406 A1 | 12/2004 | Denifl et al. | |
| 2004/0242407 A1 | 12/2004 | Denifl et al. | |
| 2006/0003888 A1* | 1/2006 | Yang et al. | 502/103 |
| 2007/0021573 A1 | 1/2007 | Zhu et al. | |
| 2009/0286672 A1 | 11/2009 | Chang | |
| 2011/0034651 A1* | 2/2011 | O'Reilly | 526/126 |

OTHER PUBLICATIONS

U.S. Appl. No. 12/711,353, filed Feb. 24, 2010, Chang.

U.S. Appl. No. 12/714,686, filed Mar. 1, 2010, Chang.

U.S. Appl. No. 12/786,701, filed May 25, 2010, Chang.

* cited by examiner

HIGH ACTIVITY CATALYST COMPONENT FOR OLEFIN POLYMERIZATION AND METHOD OF USING THE SAME

FIELD OF THE INVENTION

The present invention relates to olefin polymerization catalyst systems. In particular, the present invention relates to catalyst systems comprising (a) a solid catalyst component comprising a titanium halide, a magnesium halide, a first internal electron donor compound having at least one ether group and at least one ketone group, and a second internal electron donor compound having a 1,8-naphthyl diester structure; (b) an organoaluminum compound; and (c) an external electron donor compound. The present invention further relates to methods of making the catalyst systems and to methods of polymerizing or copolymerizing alpha-olefins using the catalyst systems.

BACKGROUND

Polyolefins are a class of polymers prepared from simple olefins. Methods of preparing polyolefins Ziegler-Natta polymerization catalysts, which use a transition metal halide to polymerize vinyl monomers and provide a polymer having an isotactic stereochemical configuration.

Typically, two types of Ziegler-Natta catalyst systems are used in the polymerization or copolymerization of olefins. The first, in its broadest definition, comprises $TiCl_3$-based catalysts components obtained by reduction of $TiCl_4$, in combination with an alkyl aluminum compound, such as diethylaluminum chloride (DEAC). These catalysts provide polymers of high isotacticity, but they have a low activity resulting in the presence of large amounts of catalyst residue in the polymers.

The second type of Ziegler-Natta catalyst system comprises a solid catalyst component, wherein a magnesium dihalide supports a titanium compound and an internal electron donor compound. A variety of internal electron donor compounds are added during catalyst synthesis in order to maintain a high selectivity for an isotactic polymer product. Conventionally, when higher polymer crystallinity is desired, an external donor compound also is added during the polymerization reaction.

The internal electron donor is an important component in a propylene polymerization catalyst. It controls catalyst activity and hydrogen response, as well as the composition of the resulting polymer. Different internal donors result in catalysts with vastly different performance characteristics. The discovery of high performance internal donor is one of the most active research activities among the major propylene catalyst producers.

Currently, three internal donor families are being used to produce polypropylene (PP) catalysts:
(a) Dialkyl phthalates, wherein the most widely used compounds are di-t-butyl phthalate and di-n-butyl phthalate. The phthalate-containing catalysts have high activities and produce PP having a high isotacticity index and a medium molecular weight distribution;
(b) Dialkyl succinates. The succinate-containing catalysts have high activities and produce PP having high isotacticity index and broad molecular weight distribution; and (c) 1,3-Diethers. The diether-containing catalysts have super high activities and produce PP with high isotacticity.

To enhance catalyst performance, substantial research efforts have been undertaken by the polyolefin industry to discover new families of high performance internal donor compounds, but with limited success. The discovery of high performance internal donors capable of producing polyolefins with the desired properties is still one of the most important research goals of the polypropylene industry.

SUMMARY OF THE INVENTION

The present invention is directed to olefin polymerization catalyst systems containing a solid catalyst component, methods of making the catalyst systems, and methods of polymerizing and copolymerizing olefins using the catalyst systems. The solid catalyst component comprises (a) a titanium halide, a magnesium halide, a first internal electron donor compound comprising at least one ether group and at least one ketone group (internal donor A), and a second internal electron donor compound having a 1,8-naphthyl diester structure (internal donor B). The present catalyst systems, in addition to a solid catalyst component, further comprise an organoaluminum compound and an external electron donor compound.

The solid catalyst component can be prepared by contacting a magnesium compound and a titanium compound with an internal donor A, internal donor B, or both internal donor A and internal donor B. The methods of polymerizing or copolymerizing olefins comprise contacting olefins with a present catalyst system.

In one aspect of the present invention, internal donor A has a structure (I):

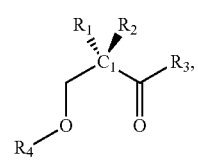

wherein $R^1$, $R^2$, $R^3$, and $R^4$, independently, represent a substituted or unsubstituted hydrocarbon group containing one to about 30 atoms.

In one embodiment, $R_1$ and $R_2$ are taken together with $C_1$ to form a 5- or 6-membered hydrocarbon ring. In another embodiment, $R_1$, $R_2$, and $C_1$ are taken together to form a fluorenyl ring structure, i.e.

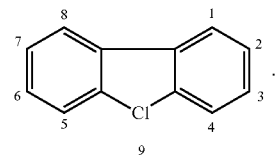

In yet another embodiment, $R_1$—$C_1$—$R_2$ of structure (I) is a pentane, cyclopentane, cyclopentadiene, cyclohexane, or cyclohexadiene derivative.

In another aspect, internal donor B has a structure (II):

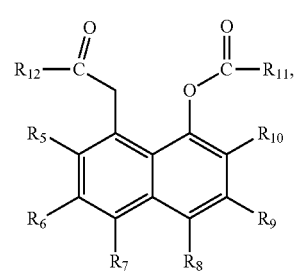

wherein $R_5$, $R_6$, $R_7$, $R_8$, $R_9$, and $R_{10}$, independently, are hydrogen, halogen, $C_1$-$C_6$ linear or branched alkyl, aryl, $C_6$-$C_{10}$ cycloalkyl, $C_1$-$C_3$ alkylenearyl, or arylene $C_1$-$C_{10}$ alkyl; and $R_{11}$ and $R_{12}$, independently, are $C_1$-$C_{20}$ linear or branched alkyl, $C_5$-$C_{10}$ cycloalkyl, $C_5$-$C_{10}$ cycloalkenyl, $C_5$-$C_{10}$ cycloalkadienyl, $C_1$-$C_3$ alkylenearyl, or arylene $C_{1-10}$ alkyl.

In another embodiment, internal donor B is a 1,8-napthyl diaryloate having a structure (III):

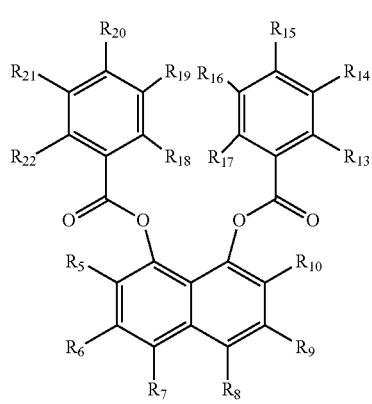

wherein $R_5$ through $R_{10}$ are as defined above, and $R_{13}$ through $R_{22}$, independently, are hydrogen, halogen, $C_1$-$C_6$ linear or branched alkyl, $C_5$-$C_{10}$ cycloalkyl, $C_1$-$C_6$ linear or branched alkoxy, aryl, $C_1$-$C_6$ alkylenearyl, or arylene $C_1$-$C_6$ alkyl.

Still another aspect of the present invention is to provide a method of polymerizing or copolymerizing an olefin using a catalyst system containing internal donor A and internal donor B, wherein the resulting polymer or copolymer has a broad molecular weight distribution, as measured by polydispersity index.

These and other aspects, advantages, and novel features of the present invention will become apparent from the following detailed description of the preferred embodiment when considered in conjunction with the drawings.

DETAILED DESCRIPTION OF THE PREFERRED EMBODIMENT

Figure 1:
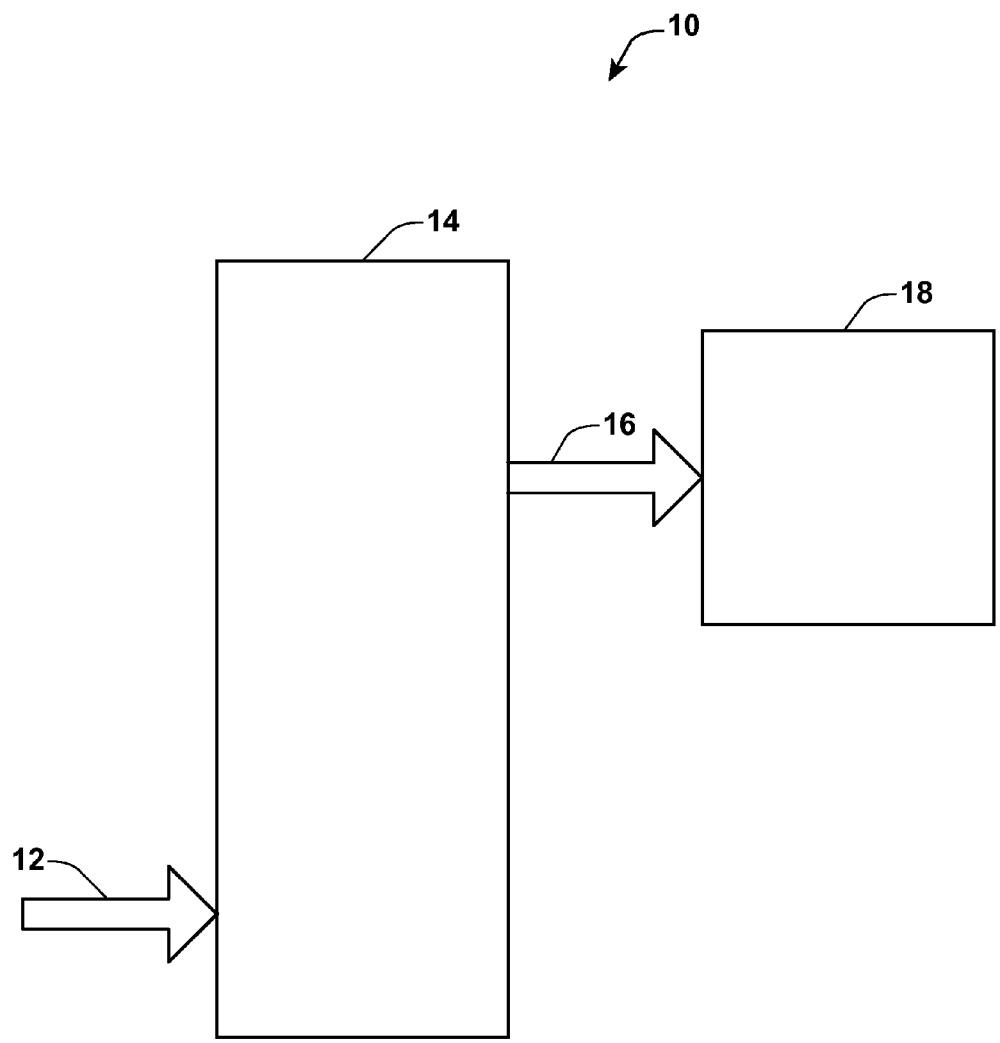
FIG. 1 is a schematic of an olefin polymerization system in accordance with an aspect of the present invention.

The present invention is directed to a solid catalyst component containing a titanium halide, a magnesium halide, a first internal electron donor compound containing at least one ether group and at least one ketone group, and a second internal electron donor compound having a 1,8-naphthyl diester structure. The solid catalyst component is used in olefin polymerization catalyst systems further comprising an organoaluminum compound and an external electron donating compound. The present invention also is directed to methods of making the solid catalyst components and the catalyst systems, and to methods of polymerizing and copolymerizing olefins using the catalyst systems.

An important aspect of the present invention is to provide a solid catalyst component containing a titanium halide, a magnesium halide, and two internal electron donor compounds. The first internal electron donor compound contains at least one ether group and at least one ketone group (donor A). The second internal electron donor compound is a 1,8-naphthyl diester (donor B). In particular, the solid catalyst component comprises a titanium compound having at least one titanium-halogen bond, a donor A, and a donor B, all supported on a magnesium halide crystal lattice. The titanium compound can be $TiCl_4$ or $TiCl_3$. In one embodiment, the magnesium halide crystal lattice is a magnesium dichloride crystal lattice.

Solid catalyst components containing both a donor A and a donor B contribute to improved performance characteristics of resulting catalysts, such as a high catalyst activity, a high hydrogen response, and an ability to produce polyolefins with a desired crystallinity measured by xylene soluble values, a desired/controllable molecular weight distribution measured by PI, and the like. In particular, a solid catalyst component containing both a donor A and a donor B provides a controllable molecular weight distribution, which can be manipulated by a judicious selection of a donor A and a donor B, and the amount of each donor.

The molecular weight distribution of a polyolefin is reflected in the polydispersity index (PI) of the polyolefin. The rheological information required to obtain the PI is the storage G'(ω) and loss G"(ω) moduli, extending from the terminal zone to the plateau region. PI is measured according to the procedure in G. Couarraze et al., *Rheol Acta.*, 25(1986), p. 494, incorporated herein by reference.

A solid catalyst component of the present invention is a highly active catalyst component containing a titanium halide, a magnesium halide, an internal donor A, and an internal donor B. The titanium compounds used in a preparation of the solid catalyst component include, for example, a tetravalent titanium compound represented by the chemical formula:

$$Ti(OR)_gX_{4-g},$$

wherein R represents a hydrocarbon group, preferably an alkyl group having 1 to about 20 carbon atoms, X represents a halogen atom, and $0 \leq g \leq 4$.

Examples of titanium compounds include, but are not limited to, titanium tetrahalides, such as $TiCl_4$, $TiBr_4$ and $TiI_4$; alkoxytitanium trihalides, such as $Ti(OCH_3)Cl_3$, $Ti(OC_2H_5)Cl_3$, $Ti(O-n-C_4H_9)Cl_3$, $Ti(OC_2H_5)Br_3$ and $Ti(O-1-C_4H_9)Br_3$; dialkoxytitanium dihalides, such as $Ti(OCH_3)_2Cl_2$, $Ti(OC_2H_5)_2Cl_2$, $Ti(O-n-C_4H_9)_2Cl_2$, and $Ti(OC_2H_5)_2Br_2$; trialkoxytitanium monohalides, such as $Ti(OCH_3)_3Cl$, $Ti(OC_2H_5)_3Cl$, $Ti(O-n-C_4H_9)_3Cl$, and $Ti(OC_2H_5)_3Br$; and tetraalkoxytitaniums, such as $Ti(OCH_3)_4$, $Ti(OC_2H_5)_4$, and $Ti(O-n-C_4H_9)_4$. In some embodiments, titanium tetrahalides are preferred. Titanium compounds can be used neat or as solutions in hydrocarbon compounds or halogenated hydrocarbons.

The magnesium compounds used in the preparation of the solid catalyst component include, for example, a magnesium compound having no reducibility. In one embodiment, the magnesium compound having no reducibility is a magnesium halide. Specific examples of magnesium compounds having no reducibility include, but are not limited to, magnesium halides, such as magnesium chloride, magnesium bromide, magnesium iodide, and magnesium fluoride; alkoxy magnesium halides, such as methoxy magnesium chloride, ethoxy magnesium chloride, isopropoxy magnesium chloride, butoxy magnesium chloride, and octoxy magnesium chloride; aryloxy magnesium halides, such as phenoxy magnesium chloride and methylphenoxy magnesium chloride; alkoxy magnesiums, such as ethoxy magnesium, isopropoxy magnesium, butoxy magnesium, n-octoxy magnesium, and 2-ethylhexoxy magnesium; aryloxy magnesiums, such as phenoxy magnesium and dimethylphenoxy magnesium; and carboxylic acid salts of magnesium, such as magnesium laurate and magnesium stearate. The magnesium compounds can be in a liquid or a solid state.

In some embodiments, halogen containing magnesium compounds, such as magnesium chloride, alkoxy magnesium chlorides, and aryloxy magnesium chlorides are preferred.

A solid catalyst component can be prepared by contacting a magnesium compound and a titanium compound with internal electron donors A and B. In one embodiment, the solid catalyst component is made by contacting a magnesium compound and a titanium compound in the presence of the internal electron donors A and B. In another embodiment, the solid catalyst component is made by forming a magnesium-based catalyst support optionally with the titanium compound and optionally with the internal electron donors A and B, and contacting the magnesium-based catalyst support with the titanium compound and the internal electron donors A and B.

An important aspect of the present invention is to provide a catalyst system for polymerizing or copolymerizing an olefin that contains at least internal donor A and internal donor B. Preferably, the internal donors A and B are present in one solid catalyst component. However, it is envisioned that one of internal donors A and B can be present in a first solid catalyst component, the other of internal donors A and B can be present in a second solid catalyst component, and the first and second catalyst components are used together in the final catalyst system. In yet another embodiment, a first solid catalyst component can contain both internal donors A and B, and a second solid catalyst component can contain either internal donor A or internal donor B, and the first and second catalyst components are used together in the final catalyst system.

In an important aspect of the present invention, internal electron donor A contains at least one ether group and at least one ketone group in its structure. More particularly, internal donor A has a structural formula (I):

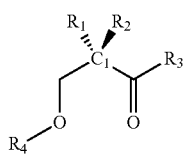
(I)

wherein $R_1$, $R_2$, $R_3$, and $R_4$, independently, represent a substituted or unsubstituted hydrocarbon group. In one embodiment, the substituted or unsubstituted hydrocarbon group includes from 1 to about 30 carbon atoms. In one embodiment, $R_1$, $C_1$, and $R_2$ are taken together to form a substituted or unsubstituted cyclic or polycyclic structure containing from about 5 to about 20 carbon atoms.

In one embodiment, $R_1$, $C_1$, and $R_2$ are taken together to form a 5- or 6-membered hydrocarbon ring. In another embodiment, $R_1$, $C_1$, and $R_2$ are taken together to form a fluorenyl ring structure, i.e.,

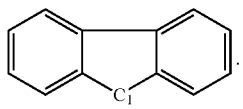

In another embodiment, $R_1$, $R_2$, $R_3$, and $R_4$ are identical or different, and each represents a linear or branched alkyl group containing from 1 to about 18 carbon atoms, a cycloaliphatic group containing from 3 to about 10 carbon atoms, an aryl group containing from about 6 to about 10 carbon atoms, a $C_1$-$C_3$ alkylenearyl group, or an arylene $C_1$-$C_6$ alkyl group.

As used herein, the term "alkylene" refers to an alkane having two substituents, e.g., methylene (—$CH_2$—).

As used herein, the term "arylene" refers to an arene having two substituents, e.g.,

As used herein, the term "arene" refers to aromatic hydrocarbons containing six to ten carbon in the ring system, and optionally substituted, independently, with one to three $C_1$-$C_6$ alkyl groups, $C_1$-$C_3$ alkylenearyl groups, or arylene $C_1$-$C_6$ alkyl groups. Benzene is an example of an arene.

The term "$C_1$-$C_3$ alkylenearyl" means a $C_1$-$C_3$ alkylene group having an aryl substituent, for example,

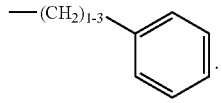

The term "arylene $C_{1-3}$ alkyl" means an arylene group having a $C_1$-$C_3$ alkyl substituent, for example

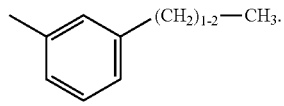

As used herein, the term "$C_x$" designates a number of carbon atoms.

In some preferred embodiments of structural formula (I), $R_3$ is linear or branched $C_1$-$C_9$ alkyl or $C_4$-$C_8$ alkylphenyl. In other preferred embodiments, O—$R_4$ is $C_1$-$C_6$ alkoxy. In other preferred embodiments, $R_1$—$C_1$—$R_2$ are taken together to form fluorene, cyclopentane, cyclopentadiene, cyclohexane, cyclohexadiene, or a $C_5$-$C_{15}$ linear or branched alkyl group.

Specific examples of an internal electron donor A include, but are not limited to, a 9-(alkylcarbonyl)-9-alkoxymethylfluorene, such as 9-(methylcarbonyl)-9-methoxymethylfluorene, 9-(methylcarbonyl)-9-ethoxymethylfluorene, 9-(methylcarbonyl)-9-propoxymethylfluorene, 9-(methylcarbonyl)-9-butoxymethylfluorene, 9-(methylcarbonyl)-9-pentoxymethylfluorene, 9-(ethylcarbonyl)-9-methoxymethylfluorene, 9-(ethylcarbonyl)-9-ethoxymethylfluorene, 9-(ethylcarbonyl)-9-propoxymethylfluorene, 9-(ethylcarbonyl)-9-butoxymethylfluorene, 9-(ethylcarbonyl)-9-pentoxymethylfluorene, 9-(propylcarbonyl)-9-methoxymethylfluorene, 9-(propylcarbonyl)-9-ethoxymethylfluorene, 9-(propylcarbonyl)-9-propoxymethylfluorene, 9-(propylcarbonyl)-9-butoxymethylfluorene, 9-(propylcarbonyl)-9-pentoxymethylfluorene, 9-(butylcarbonyl)-9-methoxymethylfluorene, 9-(butylcarbonyl)-9-ethoxymethylfluorene, 9-(butylcarbonyl)-9-propoxymethylfluorene, 9-(butylcarbonyl)-9-butoxymethylfluorene, 9-(butylcarbonyl)-9-pentoxymethylfluorene, 9-(isobutylcarbonyl)-9-methoxymethylfluorene, 9-(isobutylcarbonyl)-9-ethoxymethylfluorene, 9-(isobutylcarbonyl)-9-propoxymethylfluorene, 9-(isobutylcarbonyl)-9-butoxymethylfluorene, 9-(isobutylcarbonyl)-9-pentoxymethylfluorene, 9-(pentylcarbonyl)-9-methoxymethylfluorene, 9-(pentylcarbonyl)-9-ethoxymethylfluorene, 9-(pentylcarbonyl)-9-propoxymethylfluorene, 9-(pentylcarbonyl)-9-butoxymethylfluorene, 9-(pentylcarbonyl)-9-pentoxymethylfluorene, 9-(hexylcarbonyl)-9-methoxymethylfluorene, 9-(hexylcarbonyl)-9-ethoxymethylfluorene, 9-(hexylcarbonyl)-9-propoxymethylfluorene, 9-(hexylcarbonyl)-9-butoxymethylfluorene, 9-(hexylcarbonyl)-9-pentoxymethylfluorene, 9-(octylcarbonyl)-9-methoxymethylfluorene, 9-(octylcarbonyl)-9-ethoxymethylfluorene, 9-(octylcarbonyl)-9-propoxymethylfluorene, 9-(octylcarbonyl)-9-butoxymethylfluorene, 9-(octylcarbonyl)-9-pentoxymethylfluorene; 9-(i-octylcarbonyl)-9-methoxymethylfluorene, 9-(i-octylcarbonyl)-9-ethoxymethylfluorene, 9-(i-octylcarbonyl)-9-propoxymethylfluorene, 9-(i-octylcarbonyl)-9-butoxymethylfluorene, 9-(i-octylcarbonyl)-9-pentoxymethylfluorene, 9-(nonylcarbonyl)-9-methoxymethylfluorene, 9-(nonylcarbonyl)-9-ethoxymethylfluorene, 9-(nonylcarbonyl)-9-propoxymethylfluorene, 9-(nonylcarbonyl)-9-butoxymethylfluorene, 9-(nonylcarbonyl)-9-pentoxymethylfluorene; 9-(i-nonylcarbonyl)-9-methoxymethylfluorene, 9-(i-nonylcarbonyl)-9-ethoxymethylfluorene, 9-(i-nonylcarbonyl)-9-propoxymethylfluorene, 9-(i-nonylcarbonyl)-9-butoxymethylfluorene, 9-(i-nonylcarbonyl)-9-pentoxymethylfluorene, 9-(2-ethyl-hexylcarbonyl)-9-methoxymethylfluorene, 9-(2-ethyl-hexylcarbonyl)-9-ethoxymethylfluorene, 9-(2-ethyl-hexylcarbonyl)-9-propoxymethylfluorene, 9-(2-ethyl-hexylcarbonyl)-9-butoxymethylfluorene, 9-(2-ethyl-hexylcarbonyl)-9-pentoxymethylfluorene, 9-(phenylketone)-9-methoxymethylfluorene, 9-(phenylketone)-9-ethoxymethylfluorene, 9-(phenylketone)-9-propoxymethylfluorene, 9-(phenylketone)-9-butoxymethylfluorene, 9-(phenylketone)-9-pentoxymethylfluorene, 9-(4-methylphenylketone)-9-methoxymethylfluorene, 9-(3-methylphenylketone)-9-methoxymethylfluorene, and 9-(2-methylphenylketone)-9-methoxymethylfluorene, or mixtures thereof.

Additional nonlimiting examples of an internal donor A include 1-(ethylcarbonyl)-1-methoxymethylcyclopentane, 1-(propylcarbonyl)-1-methoxymethylcyclopentane, 1-(i-propylcarbonyl)-1-methoxymethylcyclopentane, 1-(butylcarbonyl)-1-methoxymethylcyclopentane, 1-(i-butylcarbonyl)-1-methoxymethylcyclopentane. 1-(pentylcarbonyl)-1-methoxymethylcyclopentane, 1-(i-pentylcarbonyl)-1-methoxymethylcyclopentane, 1-(neopentylcarbonyl)-1-methoxymethylcyclopentane, 1-(hexylcarbonyl)-1-methoxymethylcyclopentane, 1-(2-ethylhexylcarbonyl)-1-methoxymethylcyclopentane, 1-(octylcarbonyl)-1-methoxymethylcyclopentane, 1-(i-octylcarbonyl)-1-methoxymethylcyclopentane, 1-(nonylcarbonyl)-1-methoxymethylcyclopentane, 1-(i-nonylcarbonyl)-1-methoxymethylcyclopentane, 1-(ethylcarbonyl)-1-methoxymethyl-2-methylcyclopentane, 1-(propylcarbonyl)-1-methoxymethyl-2-methylcyclopentane, 1-(i-propylcarbonyl)-1-methoxymethyl-2-methyl-cyclopentane, 1-(butylcarbonyl)-1-methoxymethyl-2-methylcyclopentane, 1-(i-butylcarbonyl)-1-methoxymethyl-2-methylcyclopentane, 1-(pentylcarbonyl)-1-methoxymethyl-2-methylcyclopentane, 1-(i-pentylcarbonyl)-1-methoxymethyl-2-methylcyclopentane, 1-(neopentylcarbonyl)-1-methoxymethyl-2-methylcyclopentane, 1-(hexylcarbonyl)-1-methoxymethyl-2-methylcyclopentane, 1-(2-ethylhexylcarbonyl)-1-methoxymethyl-2-methyl cyclopentane, 1-(octylcarbonyl)-1-methoxymethyl-2-methyl cyclopentane, 1-(i-octylcarbonyl)-1-methoxymethyl-2-methyl cyclopentane, 1-(nonylcarbonyl)-1-methoxymethyl-2-methyl cyclopentane, 1-(i-nonylcarbonyl)-1-methoxymethyl-2-methylcyclopentane, 1-(ethylcarbonyl)-1-methoxymethyl-2,5-dimethylcyclopentane, 1-(propylcarbonyl)-1-methoxymethyl-2,5-dimethylcyclopentane, 1-(i-propylcarbonyl)-1-methoxymethyl-2,5-dimethyl-cyclopentane, 1-(butylcarbonyl)-1-methoxymethyl-2,5-di-cyclopentane, 1-(i-butylcarbonyl)-1-methoxymethyl-2,5-dimethylcyclopentane, 1-(pentylcarbonyl)-1-methoxymethyl-2,5-dimethylcyclopentane, 1-(i-pentylcarbonyl)-1-methoxymethyl-2,5-dimethylcyclopentane, 1-(neopentylcarbonyl)-1-methoxymethyl-2,5-dimethylcyclopentane, 1-(hexylcarbonyl)-1-methoxymethyl-2,5-dimethylcyclopentane, 1-(2-ethylhexylcarbonyl)-1-methoxymethyl-2,5-dimethyl cyclopentane, 1-(octylcarbonyl)-1-methoxymethyl-2,5-dimethyl cyclopentane, 1-(i-octylcarbonyl)-1-methoxymethyl-2,5-dimethyl cyclopentane, 1-(nonylcarbonyl)-1-methoxymethyl-2,5-dimethyl cyclopentane, 1-(i-nonylcarbonyl)-1-methoxymethyl-2,5-dimethyl cyclopentane, 1-(ethylcarbonyl)-1-methoxymethyl-2,4-cyclopentadiene, 1-(propylcarbonyl)-1-methoxymethyl-2,4-cyclopentadiene, 1-(i-propylcarbonyl)-1-methoxymethyl-2,4-cyclopentadiene, 1-(butylcarbonyl)-1-methoxymethyl-2,4-cyclopentadiene, 1-(i-butylcarbonyl)-1-methoxymethyl-2,4-cyclopentadiene, 1-(pentylcarbonyl)-1-methoxymethyl-2,4-cyclopentadiene, 1-(i-pentylcarbonyl)-1-methoxymethyl-2,4-cyclopentadiene, 1-(neopentylcarbonyl)-1-methoxymethyl-2,4-cyclopentadiene, 1-(hexylcarbonyl)-1-methoxymethyl-2,4-cyclopentadiene, 1-(2-ethylhexylcarbonyl)-1-methoxymethyl-2,4-cyclopentadiene, 1-(octylcarbonyl)-1-methoxymethyl-2,4-cyclopentadiene, 1-(i-octylcarbonyl)-1-methoxymethyl-2,4-cyclopentadiene, 1-(nonylcarbonyl)-1-methoxymethyl-2,4-cyclopentadiene, 1-(i-nonylcarbonyl)-1-methoxymethyl-2,4-cyclopentadiene, 1-(ethylcarbonyl)-1-methoxymethyl-2-methyl-2,4-cyclopentadiene, 1-(propylcarbonyl)-1-methoxymethyl-2-methyl-2,4-cyclopentadiene, 1-(i-propylcarbonyl)-1-methoxymethyl-2-methyl-2,4-cyclopentadiene, 1-(butylcarbonyl)-1-methoxymethyl-2-methyl-2,4-cyclopentadiene, 1-(i-butylcarbonyl)-1-methoxymethyl-2-methyl-2,4-cyclopentadiene, 1-(pentylcarbonyl)-1-methoxymethyl-2-methyl-2,4-cyclopentadiene, 1-(i-pentylcarbonyl)-1-methoxymethyl-2-methyl-2,4-cyclopentadiene, 1-(neopentylcarbonyl)-1-methoxymethyl-2-methyl-2,4-cyclopentadiene, 1-(hexylcarbonyl)-1-methoxymethyl-2-methyl-2,4-cyclopentadiene, 1-(2-ethylhexylcarbonyl)-1-methoxymethyl-2-methyl-2,4-cyclopentadiene, 1-(octylcarbonyl)-1-methoxymethyl-2-methyl-2,4-cyclopentadiene, 1-(i-octylcarbonyl)-1-methoxymethyl-2-methyl-2,4-cyclopentadiene, 1-(nonylcarbonyl)-1-methoxymethyl-2-methyl-2,4-cyclopentadiene, nonylcarbonyl)-1-methoxymethyl-2-methyl-2,4-cyclopentadiene, 1-(ethylcarbonyl)-1-methoxymethyl-2,5-dimethyl-2,4-cyclopentadiene, 1-(propylcarbonyl)-1-methoxymethyl-2,5-dimethyl-2,4-cyclopentadiene, 1-(i-propylcarbonyl)-1-methoxymethyl-2,5-dimethyl-2,4-cyclopentadiene, 1-(butylcarbonyl)-1-methoxymethyl-2,5-dimethyl-2,4-cyclopentadiene, 1-(i-butylcarbonyl)-1-methoxymethyl-2,5-dimethyl-2,4-cyclopentadiene, 1-(pentylcarbonyl)-1-methoxymethyl-2,5-dimethyl-2,4-cyclopentadiene, 1-(i-pentylcarbonyl)-1-methoxymethyl-2,5-dimethyl-2,4-cyclopentadiene, 1-(neopentylcarbonyl)-1-methoxymethyl-2,5-dimethyl-2,4-cyclopentadiene, 1-(hexylcarbonyl)-1-methoxymethyl-2,5-dimethyl-2,4-cyclopentadiene, 1-(2-ethylhexylcarbonyl)-1-methoxymethyl-2,5-dimethyl-2,4-cyclopentadiene, 1-(octylcarbonyl)-1-methoxymethyl-2,5-dimethyl-2,4-cyclopentadiene, 1-(i-octylcarbonyl)-1-methoxymethyl-2,5-dimethyl-2,4-cyclopentadiene, 1-(nonylcarbonyl)-1-methoxymethyl-2,5-dimethyl-2,4-cyclopentadiene, 1-(i-nonylcarbonyl)-1-methoxymethyl-2,5-dimethyl-2,4-cyclopentadiene, 1-(ethylcarbonyl)-1-methoxymethylcyclohexane, 1-(propylcarbonyl)-1-methoxymethylcyclohexane, 1-(i-propylcarbonyl)-1-methoxymethylcyclohexane, 1-(butylcarbonyl)-1-methoxymethylcyclohexyl, 1-(i-butylcarbonyl)-1-methoxymethylcyclohexane, 1-(pentylcarbonyl)-1-methoxymethylcyclohexane, 1-(i-pentylcarbonyl)-1-methoxymethylcyclohexane, 1-(neopentylcarbonyl)-1-methoxymethylcyclohexane, 1-(hexylcarbonyl)-1-methoxymethylcyclohexane, 1-(2-ethylhexylcarbonyl)-1-methoxymethylcyclohexane, 1-(octylcarbonyl)-1-methoxymethylcyclohexane, 1-(i-octylcarbonyl)-1-methoxymethylcyclohexane, 1-(i-nonylcarbonyl)-1-methoxymethylcyclohexane, 1-(ethylcarbonyl)-1-methoxymethyl-2-methylcyclohexane, 1-(propylcarbonyl)-1-methoxymethyl-2-methylcyclohexane, 1-(i-propanecarbonyl)-1-methoxymethyl-2-methylcyclohexane, 1-(butylcarbonyl)-1-methoxymethyl-2-methylcyclohexane, 1-(i-butylcarbonyl)-1-methoxymethyl-2-methylcyclohexane, 1-(pentylcarbonyl)-1-methoxymethyl-2-methylcyclohexane, 1-(i-pentylcarbonyl)-1-methoxymethyl-2-methylcyclohexane, 1-(neopentylcarbonyl)-1-methoxymethyl-2-methylcyclohexane, 1-(hexylcarbonyl)-1-methoxymethyl-2-methylcyclohexane, 1-(2-ethylhexylcarbonyl)-1-methoxymethyl-2-methylcyclohexane, 1-(octylcarbonyl)-1-methoxymethyl-2-methylcyclohexane, 1-(i-octylcarbonyl)-1-methoxymethyl-2-methylcyclohexane, 1-(i-nonylcarbonyl)-1-methoxymethyl-2-methyl cyclohexane, 1-(ethylcarbonyl)-1-methoxymethyl-2,6-dimethylcyclohexane, 1-(propylcarbonyl)-1-methoxymethyl-2,6-dimethylcyclohexane, 1-(i-propylcarbonyl)-1-methoxymethyl-2,6-dimethyl-cyclohexane, 1-(butylcarbonyl)-1-methoxymethyl-2,6-dimethyl-cyclohexane, 1-(i-butylcarbonyl)-1-methoxymethyl-2,6-dimethylcyclohexane, 1-(pentylcarbonyl)-1-methoxymethyl-2,6-dimethylcyclohexane, 1-(i-pentylcarbonyl)-1-methoxymethyl-2,6-dimethylcyclohexane, 1-(neopentylcarbonyl)-1-methoxymethyl-2,6-dimethylcyclohexane, 1-(hexylcarbonyl)-1-methoxymethyl-2,6-dimethylcyclohexane, 1-(2-ethylhexylcarbonyl)-1-methoxymethyl-2,6-dimethyl cyclohexane, 1-(octylcarbonyl)-1-methoxymethyl-2,6-dimethyl cyclohexane, 1-(i-octylcarbonyl)-1-methoxymethyl-2,6-dimethyl cyclohexane, 1-(i-nonylcarbonyl)-1-methoxymethyl-2,6-dimethyl cyclohexane, 2,5-dimethyl-3-ethylcarbonyl-3'-methoxymethylpentane, 2,5-dimethyl-3-propylcarbonyl-3'-methoxymethylpentane, 2,5-dimethyl-3-propylcarbonyl-3'-methoxymethylpentane, 2,5-dimethyl-3-butylcarbonyl-3'-methoxymethylpentane, 2,5-dimethyl-3-i-butylcarbonyl-1-methoxymethylcyclohexyl, 1-(ethylcarbonyl)-1-methoxymethyl-2,5-cyclohexadiene, 1-(propylcarbonyl)-1-methoxymethyl-2,5-cyclohexadiene, 1-(i-propylcarbonyl)-1-methoxymethyl-2,5-cyclohexadiene, 1-(butylcarbonyl)-1-methoxymethylcyclohexyl, 1-(i-butylcarbonyl)-1-methoxymethyl-2,5-cyclohexadiene, 1-(pentylcarbonyl)-1-methoxymethyl-2,5-cyclohexadiene, 1-(i-pentylcarbonyl)-1-methoxymethyl-2,5-cyclohexadiene, 1-(neopentylcarbonyl)-1-methoxymethyl-2,5-cyclohexadiene, 1-(hexylcarbonyl)-1-methoxymethyl-2,5-cyclohexadiene, 1-(2-ethylhexylcarbonyl)-1-methoxymethyl-2,5-cyclohexadiene, 1-(octylcarbonyl)-1-methoxymethyl-2,5-cyclohexadiene, 1-(i-octylcarbonyl)-1-methoxymethyl-2,5-cyclohexadiene, 1-(i-nonylcarbonyl)-1-methoxymethyl-2,5-cyclohexadiene, 1-(ethylcarbonyl)-1-methoxymethyl-2-methyl-2,5-cyclohexadiene, 1-(propylcarbonyl)-1-methoxymethyl-2-methyl-2,5-cyclohexadiene, 1-(i-propanecarbonyl)-1-methoxymethyl-2-methyl-2,5-cyclohexadiene, 1-(butylcarbonyl)-1-methoxymethyl-2-methyl-2,5-cyclohexadiene, 1-(i-butylcarbonyl)-1-methoxymethyl-2-methyl-2,5-cyclohexadiene, 1-(pentylcarbonyl)-1-methoxymethyl-2-methyl-2,5-cyclohexadiene, 1-(i-pentylcarbonyl)-1-methoxymethyl-2-methyl-2,5-cyclohexadiene, 1-(neopentylcarbonyl)-1-methoxymethyl-2-methyl-2,5-cyclohexadiene, 1-(hexylcarbonyl)-1-methoxymethyl-2-methyl-2,5-cyclohexadiene, 1-(2-ethylhexylcarbonyl)-1-methoxymethyl-2-methyl-2,5-cyclohexadiene, 1-(octylcarbonyl)-1-methoxymethyl-2-methyl-2,5-cyclohexadiene, 1-(i-octylcarbonyl)-1-methoxymethyl-2-methyl-2,5-cyclohexadiene, 1-(i-nonylcarbonyl)-1-methoxymethyl-2-methyl-2,5-cyclohexadiene, 1-(ethylcarbonyl)-1-methoxymethyl-2,6-dimethyl-2,5-cyclohexadiene, 1-(propylcarbonyl)-1-methoxymethyl-2,6-dimethyl-2,5-cyclohexadiene, 1-(i-propylcarbonyl)-1-methoxymethyl-2,6-dimethyl-2,5-cyclohexadiene, 1-(butylcarbonyl)-1-methoxymethyl-2,6-dimethyl-2,5-cyclohexadiene, 1-(i-butylcarbonyl)-1-methoxymethyl-2,6-dimethyl-2,5-cyclohexadiene, 1-(pentylcarbonyl)-1-methoxymethyl-2,6-dimethyl-2,5-cyclohexadiene, 1-(i-pentylcarbonyl)-1-methoxymethyl-2,6-dimethyl-2,5-cyclohexadiene, 1-(neopentylcarbonyl)-1-methoxymethyl-2,6-dimethyl-2,5-cyclohexadiene, 1-(hexylcarbonyl)-1-methoxymethyl-2,6-dimethyl-2,5-cyclohexadiene, 1-(2-ethylhexylcarbonyl)-1-methoxymethyl-2,6-dimethyl-2,5-cyclohexadiene, 1-(octylcarbonyl)-1-methoxymethyl-2,6-dimethyl-2,5-cyclohexadiene, 1-(i-octylcarbonyl)-1-methoxymethyl-2,6-dimethyl-2,5-cyclohexadiene, 1-(i-nonylcarbonyl)-1-methoxymethyl-2,6-dimethyl-2,5-cyclohexadiene, 2,5-dimethyl-3-ethylcarbonyl-3'-methoxymethylpentane, 2,5-dimethyl-3-propylcarbonyl-3'-methoxymethylpentane, 2,5-dimethyl-3-i-propylcarbonyl-3'-methoxymethylpentane, 2,5-dimethyl-3-butylcarbonyl-3'-methoxymethylpentane, 2,5-dimethyl-3-i-butylcarbonyl-1-methoxymethylcyclohexyl, 4-isopropyl-4-(methoxymethyl)-7-methyloctan-3-one, 5-isopropyl-5-(methoxymethyl)-2,8-dimethylnonan-4-one, 5-isopropyl-5-(methoxymethyl)-8-methylnonan-4-one, 6-isopropyl-6-(methoxymethyl)-9-methyldecan-5-one, 5-isopropyl-5-(methoxymethyl)-2-methylundecan-6-one, 5-isopropyl-5-(methoxymethyl)-2-methyldodecan-6-one, 5-isopropyl-5-(methoxymethyl)-2-methyltridecan-6-one, 4-isopentyl-4-

(methoxymethyl)-7-methyloctan-3-one, 5-isopentyl-5-(methoxymethyl)-8-methylnonan-4-one, 6-isopentyl-6-(methoxymethyl)-9-methyldecan-5-one, 5-isopentyl-5-(methoxymethyl)-2-methylundecan-6-one, 5-isopentyl-5-(methoxymethyl)-2-methyldodecan-6-one, 5-isopentyl-5-(methoxymethyl)-2-methyltridecan-6-one, 4-isobutyl-4-(methoxymethyl)-6-methylheptan-3-one, 5-isobutyl-5-(methoxymethyl)-7-methyloctan-4-one, 4-isobutyl-4-(methoxymethyl)-2-methylnonan-5-one, 4-isobutyl-4-(methoxymethyl)-2-methyldecan-5-one, and 4-isobutyl-4-(methoxymethyl)-2-methylundecan-5-one, or mixtures thereof.

A single internal donor compound A can be used in a present solid catalyst component, or a mixture of two or more internal donors A can be used.

Internal electron donor B is a 1,8-naphthyl diester compound having a structural formula (II):

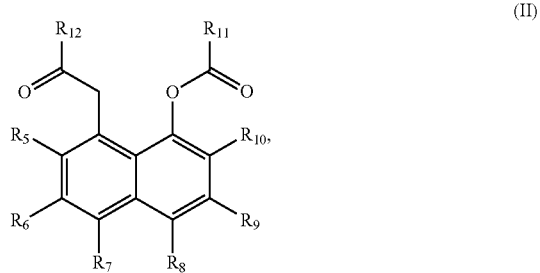

(II)

wherein $R_5$ through $R_{10}$, independently, are hydrogen, halogen, $C_1$-$C_6$ linear or branched alkyl, $C_6$-$C_{10}$ cycloalkyl, phenyl, $C_1$-$C_3$ alkylenearyl, arylene $C_1$-$C_6$ alkyl; and $R_{11}$ and $R_{12}$, independently, are $C_1$-$C_{20}$ linear or branched alkyl, $C_5$-$C_{10}$ cycloalkyl, $C_5$-$C_{10}$ cycloalkaenyl, $C_5$-$C_{10}$ cycloalkadienyl, phenyl, $C_1$-$C_3$ alkylenearyl, or arylene $C_1$-$C_6$ alkyl.

The 1,8-naphthyl diester compound can be one or more of a naphthalene-1,8-diyl dicycloalkanecarboxylate derivative, a naphthalene-1,8-diyl dicycloalkenecarboxylate derivative, an 8-(cycloalkanecarbonyloxy)naphthalene-1-yl benzoate derivative, an 8-(cycloalkenecarbonyloxy)naphthalene-1-yl benzoate derivative, a 1,8-naphthyl diaryloate derivative, and mixtures thereof.

Examples of naphthalene-1,8-diyl dicycloalkanecarboxylate derivatives include, but are not limited to, naphthalene-1,8-diyl dicyclohexanecarboxylate, naphthalene-1,8-diyl di-2-methylcyclohexanecarboxylate, naphthalene-1,8-diyl di-3-methylcyclohexanecarboxylate, and naphthalene-1,8-diyl di-4-methylcyclohexanecarboxylate.

Examples of naphthalene-1,8-diyl dicycloalkenecarboxylate derivatives include, but are not limited to, naphthalene-1,8-diyl dicyclohex-1-enecarboxylate, naphthalene-1,8-diyl dicyclohex-2-enecarboxylate, and naphthalene-1,8-diyl dicyclohex-3-enecarboxylate.

Examples of 8-(cycloalkanecarbonyloxy)naphthalene-1-yl benzoate derivatives include, but are not limited to, 8-(cyclohexanecarbonyloxy)naphthalene-1-yl benzoate, 8-(2-methylcyclohexanecarbonyloxy)naphthalene-1-yl benzoate, 8-(3-methylcyclohexanecarbonyloxy)naphthalene-1-yl benzoate, 8-(4-methylcyclohexanecarbonyloxy)naphthalene-1-yl benzoate, 8-(2-methylcyclohexanecarbonyloxy)naphthalene-1-yl 2-methylbenzoate, 8-(3-methylcyclohexanecarbonyloxy)naphthalene-1-yl 2-methylbenzoate, 8-(4-methylcyclohexanecarbonyloxy) naphthalene-1-yl 2-methylbenzoate, 8-(2-methylcyclohexanecarbonyloxy)naphthalene-1-yl 3-methylbenzoate, 8-(3-methylcyclohexanecarbonyloxy)naphthalene-1-yl 3-methylbenzoate, 8-(4-methylcyclohexanecarbonyloxy)naphthalene-1-yl 3-methylbenzoate, 8-(2-methylcyclohexanecarbonyloxy) naphthalene-1-yl 3-methylbenzoate, 8-(2-methylcyclohexanecarbonyloxy)naphthalene-1-yl 4-methylbenzoate, 8-(3-methylcyclohexanecarbonyloxy)naphthalene-1-yl 4-methylbenzoate, and 8-(4-methylcyclohexanecarbonyloxy)naphthalene-1-yl 4-methylbenzoate.

Examples of 8-(cycloalkenecarbonyloxy)naphthalene-1-yl benzoate derivatives include, but are not limited to, 8-(cyclohex-1-enecarbonyloxy)naphthalene-1-yl benzoate, 8-(cyclohex-2-enecarbonyloxy)naphthalene-1-yl benzoate, 8-(cyclohex-3-enecarbonyloxy)naphthalene-1-yl benzoate, 8-(cyclohex-1-enecarbonyloxy)naphthalene-1-yl 2-methylbenzoate, 8-(cyclohex-2-enecarbonyloxy)naphthalene-1-yl 2-methylbenzoate, 8-(cyclohex-3-enecarbonyloxy)naphthalene-1-yl 2-methylbenzoate, 8-(cyclohex-1-enecarbonyloxy) naphthalene-1-yl 3-methylbenzoate, 8-(cyclohex-2-enecarbonyloxy)naphthalene-1-yl 3-methylbenzoate, 8-(cyclohex-3-enecarbonyloxy)naphthalene-1-yl 3-methylbenzoate, 8-(cyclohex-1-enecarbonyloxy)naphthalene-1-yl 4-methylbenzoate, 8-(cyclohex-2-enecarbonyloxy)naphthalene-1-yl 4-methylbenzoate, 8-(cyclohex-3-enecarbonyloxy)naphthalene-1-yl 4-methylbenzoate, 8-(2-methylcyclohex-1-enecarbonyloxy)naphthalene-1-yl benzoate, 8-(2-methylcyclohex-2-enecarbonyloxy)naphthalene-1-yl benzoate, 8-(2-methylcyclohex-3-enecarbonyloxy)naphthalene-1-yl benzoate, 8-(2-methylcyclohex-1-enecarbonyloxy)naphthalene-1-yl 2-methylbenzoate, 8-(2-methylcyclohex-2-enecarbonyloxy)naphthalene-1-yl 2-methylbenzoate, 8-(2-methylcyclohex-3-enecarbonyloxy)naphthalene-1-yl 2-methylbenzoate, 8-(2-methylcyclohex-1-enecarbonyloxy) naphthalene-1-yl 3-methylbenzoate, 8-(2-methylcyclohex-2-enecarbonyloxy)naphthalene-1-yl 3-methylbenzoate, 8-(2-methylcyclohex-3-enecarbonyloxy)naphthalene-1-yl 3-methylbenzoate, 8-(2-methylcyclohex-1-enecarbonyloxy) naphthalene-1-yl 4-methylbenzoate, 8-(2-methylcyclohex-2-enecarbonyloxy)naphthalene-1-yl 4-methylbenzoate, 8-(2-methylcyclohex-3-enecarbonyloxy)naphthalene-1-yl 4-methylbenzoate, 8-(3-methylcyclohex-1-enecarbonyloxy) naphthalene-1-yl benzoate, 8-(3-methylcyclohex-2-enecarbonyloxy)naphthalene-1-yl benzoate, 8-(3-methylcyclohex-3-enecarbonyloxy)naphthalene-1-yl benzoate, 8-(3-methylcyclohex-1-enecarbonyloxy)naphthalene-1-yl 2-methylbenzoate, 8-(3-methylcyclohex-2-enecarbonyloxy) naphthalene-1-yl 2-methylbenzoate, 8-(3-methylcyclohex-3-enecarbonyloxy)naphthalene-1-yl 2-methylbenzoate, 8-(3-methylcyclohex-1-enecarbonyloxy)naphthalene-1-yl 3-methylbenzoate, 8-(3-methylcyclohex-2-enecarbonyloxy) naphthalene-1-yl 3-methylbenzoate, 8-(3-methylcyclohex-3-enecarbonyloxy)naphthalene-1-yl 3-methylbenzoate, 8-(3-methylcyclohex-1-enecarbonyloxy)naphthalene-1-yl 4-methylbenzoate, 8-(3-methylcyclohex-2-enecarbonyloxy) naphthalene-1-yl 4-methylbenzoate, 8-(3-methylcyclohex-3-enecarbonyloxy)naphthalene-1-yl 4-methylbenzoate, 8-(4-methylcyclohex-1-enecarbonyloxy)naphthalene-1-yl benzoate, 8-(4-methylcyclohex-2-enecarbonyloxy)naphthalene-1-yl benzoate, 8-(4-methylcyclohex-3-enecarbonyloxy) naphthalene-1-yl benzoate, 8-(4-methylcyclohex-1-enecarbonyloxy)naphthalene-1-yl 2-methylbenzoate, 8-(4-methylcyclohex-2-enecarbonyloxy)naphthalene-1-yl 2-methylbenzoate, 8-(4-methylcyclohex-3-enecarbonyloxy) naphthalene-1-yl 2-methylbenzoate, 8-(4-methylcyclohex-1-enecarbonyloxy)naphthalene-1-yl 3-methylbenzoate, 8-(4-methylcyclohex-2-enecarbonyloxy)naphthalene-1-yl 3-methylbenzoate, 8-(4-methylcyclohex-3-enecarbonyloxy)

naphthalene-1-yl 3-methylbenzoate; 8-(4-methylcyclohex-1-enecarbonyloxy)naphthalene-1-yl 4-methylbenzoate, 8-(4-methylcyclohex-2-enecarbonyloxy)naphthalene-1-yl 4-methylbenzoate, and 8-(4-methylcyclohex-3-enecarbonyloxy)naphthalene-1-yl 4-methylbenzoate.

In one preferred embodiment, internal donor B is a 1,8-naphthyl diaryloate compound. While not wishing to be bound by any theory, it is believed that a 1,8-naphthyl diaryloate has a chemical structure that permits binding to a solid catalyst component of a present olefin polymerization catalyst system.

The 1,8-naphthyl diaryloate compounds are represented by structural formula (III):

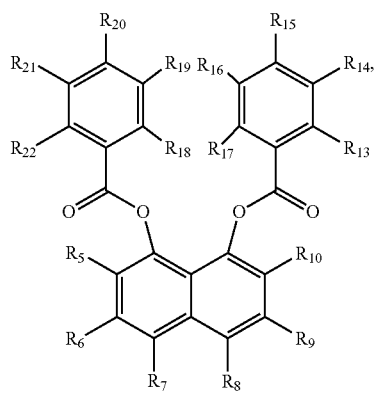

(IV)

wherein $R_5$ through $R_{10}$ are as defined above, and $R_{13}$ through $R_{22}$, independently, are hydrogen, halogen, $C_1$-$C_6$ linear or branched alkyl, $C_5$-$C_{10}$ cycloalkyl, $C_1$-$C_6$ linear or branched alkoxyl, aryl, $C_7$-$C_{10}$ arylalkyl, $C_1$-$C_6$ alkylenearyl, or arylene $C_1$-$C_6$ alkyl.

Examples of 1,8-naphthyl diaryloate compounds include, but are not limited to 1,8-naphthyl di(alkylbenzoates); 1,8-naphthyl di(dialkylbenzoates); 1,8-naphthyl di(trialkylbenzoates); 1,8-naphthyl di(arylbenzoates); 1,8-naphthyl di(halobenzoates); 1,8-napthyl di(dihalobenzoates); 1,8-naphthyl di(alkylhalobenzoate); and the like, and mixtures thereof.

Examples of 1,8-naphthyl diaryloate compounds include, but are not limited to 1,8-naphthyl dibenzoate; 1,8-naphthyl di-4-methylbenzoate; 1,8-naphthyl di-3-methylbenzoate; 1,8-naphthyl di-2-methylbenzoate; 1,8-naphthyl di-4-ethylbenzoate; 1,8-naphthyl di-4-n-propylbenzoate; 1,8-naphthyl di-4-isopropylbenzoate; 1,8-naphthyl di-4-n-butylbenzoate; 1,8-naphthyl di-4-isobutylbenzoate; 1,8-naphthyl di-4-t-butylbenzoate; 1,8-naphthyl di-4-phenylbenzoate; 1,8-naphthyl di-4-fluorobenzoate; 1,8-naphthyl di-3-fluorobenzoate; 1,8-naphthyl di-2-fluorobenzoate; 1,8-naphthyl di-4-chlorobenzoate; 1,8-naphthyl di-3-chlorobenzoate; 1,8-naphthyl di-2-chlorobenzoate; 1,8-naphthyl di-4-bromobenzoate; 1,8-naphthyl di-3-bromobenzoate; 1,8-naphthyl di-2-bromobenzoate; 1,8-naphthyl di-4-cyclohexylbenzoate; 1,8-naphthyl di-2,3-dimethylbenzoate; 1,8-naphthyl di-2,4-dimethylbenzoate; 1,8-naphthyl di-2,5-dimethylbenzoate; 1,8-naphthyl di-2,6-dimethylbenzoate; 1,8-naphthyl di-3,4-dimethylbenzoate; 1,8-naphthyl di-3,5-dimethylbenzoate; 1,8-naphthyl di-2,3-dichlorobenzoate; 1,8-naphthyl di-2,4-dichlorobenzoate; 1,8-naphthyl di-2,5-dichlorobenzoate; 1,8-naphthyl di-2,6-dichlorobenzoate; 1,8-naphthyl di-3,4-dichlorobenzoate; 1,8-naphthyl di-3,5-dichlorobenzoate; 1,8-naphthyl di-3,5-di-t-butylbenzoate; and the like, and mixtures thereof.

Donor B compounds can be made in any suitable manner, such as reacting 1,8-dihydroxynaphthalene with an aryl acid halide, as illustrated below:

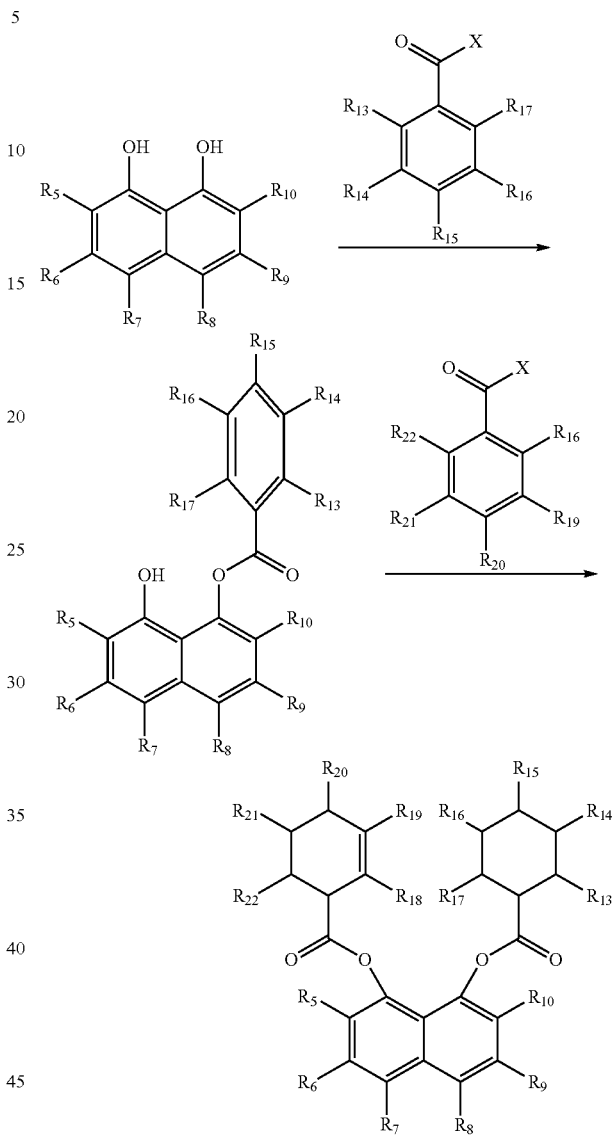

wherein $R_5$ through $R_{22}$ are as defined above, and X is Cl, Br, or I.

A single internal donor compound B can be used in a present solid catalyst component, or a mixture of two or more internal donors B can be used.

In one embodiment, the solid catalyst component comprises internal electron donor compound A and internal electron donor B, but does not include any additional internal electron donors. In another embodiment, the solid catalyst component includes internal electron donors A and B and one or more additional internal electron donors. For example, when preparing the solid catalyst component, one or more additional internal electron donors can be added in addition to the internal electron donors A and B.

Examples of additional internal electron donors include oxygen-containing electron donors, such as organic acid esters and diether compounds. Examples of additional organic acid ester internal electron donor compounds include, but are not limited to, diethyl ethylmalonate, diethyl propylmalonate, diethyl isopropylmalonate, diethyl butylmalonate, diethyl 1,2-cyclohexanedicarboxylate, di-2-ethylhexyl 1,2-cyclohexanedicarboxylate, di-2-isononyl 1,2-cyclohexanedicarboxylate, diethyl succinate, dipropyl succinate, diisopropyl succinate, dibutyl succinate, diisobutyl succinate, dioctyl succinate, and diisononyl succinate. Diether internal electron donor compounds can be, for example, 9,9-bis(methoxymethyl)fluorine, 2-isopropyl-2-isopentyl-1,3-dimethoxypropane, 2,2-diisobutyl-1,3-dimethoxypropane, 2,2-diisopentyl-1,3-dimethoxypropane, and 2-isopropyl-2-cyclohexyl-1,3-dimethoxypropane.

In addition to incorporating internal electron donors A and B, directly into the solid catalyst component. It is envisioned that precursor compounds convertible to electron donor A and/or B in the course of preparing a solid catalyst component also can be used.

A solid catalyst component can be made by contacting a magnesium compound and a titanium compound with internal donors A and B. In one embodiment, the solid catalyst component is made by contacting a magnesium compound and a titanium compound in the presence of internal donors A and B. In another embodiment, the solid catalyst component is made by forming a magnesium-based catalyst support/catalyst crystal lattice optionally with a titanium compound and optionally with an internal donors A and B, and contacting the magnesium-based catalyst support/catalyst crystal lattice with the titanium compound and internal donors A and B. In yet another embodiment, the solid catalyst component is made by contacting a magnesium-based catalyst support/catalyst crystal lattice with a titanium compound to form a mixture, then contacting the mixture with an internal donors A and B. In still yet another embodiment, the solid catalyst component is made by contacting a magnesium-based catalyst support/catalyst crystal lattice with a titanium compound to form a mixture, then contacting the mixture with internal donors A and B, then contacting the mixture again with donors A and B. Such repeated contact with the internal electron donors A and B can occur twice, three times, four times or more, successively or with other process steps performed between contacts with additional doses of donors A and B.

Generally speaking, the magnesium-based catalyst support/catalyst crystal lattice is made by dissolving a magnesium compound in a solvent mixture comprising an organic epoxy compound, an organic phosphorus compound, and an optional inert diluent to form a homogenous solution.

Organic epoxy compounds useful in the present invention include compounds having at least one epoxy group in the form of monomers, dimers, oligomers, and/or polymers. Examples of epoxy compounds include, but are not limited to, aliphatic epoxy compounds, alicyclic epoxy compounds, aromatic epoxy compounds, and the like. Examples of aliphatic epoxy compounds include, but are not limited to, halogenated aliphatic epoxy compounds, aliphatic epoxy compounds having a keto group, aliphatic epoxy compounds having an ether bond, aliphatic epoxy compounds having an ester bond, aliphatic epoxy compounds having a tertiary amino group, aliphatic epoxy compounds having a cyano group, and the like. Examples of alicyclic epoxy compounds include, but are not limited to, halogenated alicyclic epoxy compounds, alicyclic epoxy compounds having a keto group, alicyclic epoxy compounds having an ether bond, alicyclic epoxy compounds having an ester bond, alicyclic epoxy compounds having a tertiary amino group, alicyclic epoxy compounds having a cyano group, and the like. Examples of aromatic epoxy compounds include, but are not limited to, halogenated aromatic epoxy compounds, aromatic epoxy compounds having a keto group, aromatic epoxy compounds having an ether bond, aromatic epoxy compounds having an ester bond, aromatic epoxy compounds having a tertiary amino group, aromatic epoxy compounds having a cyano group, and the like.

Examples of epoxy compounds include, but are not limited to, epifluorohydrin, epichlorohydrin, epibromohydrin, hexafluoropropylene oxide, 1,2-epoxy-4-fluorobutane, 1-(2,3-epoxypropyl)-4-fluorobenzene, 1-(3,4-epoxybutyl)-2-fluorobenzene, epoxypropyl)-4-chlorobenzene, 1-(3,4-epoxybutyl)-3-chlorobenzene, and the like. Nonlimiting examples of halogenated alicyclic epoxy compounds include 4-fluoro-1,2-cyclohexene oxide, 6-chloro-2,3 epoxybicyclo[2,2,1]heptane, and the like. Nonlimiting examples of halogenated aromatic epoxy compounds include 4-fluorostyrene oxide, 1-(1,2-epoxypropyl)-3-trifluorobenzene, and the like.

Organic phosphorus compounds useful in the present invention include, but are not limited to, hydrocarbyl esters and halohydrocarbyl esters of orthophosphoric acid and phosphorous acid. Specific examples include, but are not limited to, trimethyl phosphate, triethyl phosphate, tributyl phosphate, triphenyl phosphate, trimethyl phosphite, triethyl phosphite, tributyl phosphite, and triphenyl phosphite.

An optional inert diluent facilitates dissolving a magnesium compound. The inert diluent can be any aromatic hydrocarbon or alkane, as long as it facilitates dissolution of the magnesium compound. Examples of an aromatic hydrocarbon include, but are not limited to, benzene, toluene, xylene, chlorobenzene, dichlorobenzene, trichlorobenzene, chlorotoluene, and derivatives thereof. Examples of an alkane include linear, branched, or cyclic alkanes having about 3 to about 30 carbons, such as butane, pentane, hexane, cyclohexane, heptanes, and the like. These inert diluents can be used alone or in combination.

In embodiments of making the solid catalyst component according to the Examples, the magnesium-based catalyst support/catalyst crystal lattice is mixed with a titanium compound, such as liquid titanium tetrahalide, to form a solid precipitate in the optional presence of an auxiliary precipitant. The auxiliary precipitant may be added before, during, or after the precipitation of the solids and loaded on the solids.

Auxiliary precipitants used in the present invention include carboxylic acids, carboxylic acid anhydrides, ethers, ketones, or mixture thereof. Examples include, but are not limited to, acetic anhydride, phthalic anhydride, succinic anhydride, maleic anhydride, 1,2,4,5-benzene tetracarboxylic dianhydride, acetic acid, propionic acid, butyric acid, acrylic acid, methacrylic acid, acetone, methyl ethyl ketone, benzophenone, dimethyl ether, diethyl ether, dipropyl ether, dibutyl ether, dipentyl ether, and mixtures thereof.

The process of solids precipitation can be achieved by one of at least three methods. One method involves mixing a titanium compound, such as liquid titanium tetrahalide, with a magnesium containing solution at a temperature of about −40° C. to about 0° C., and precipitating the solids while the temperature is raised slowly to about 30° C. to about 120° C., such as about 60° C. to about 100° C. The second method involves adding a titanium compound dropwise into a magnesium containing solution at low or room temperature to precipitate out solids immediately. The third method involves adding a first titanium compound dropwise into a magnesium containing solution and mixing a second titanium compound with the magnesium-based catalyst support/catalyst crystal lattice. In these methods, internal donors A and B desirably are present in the reaction system. Internal donors A and B can be added after the magnesium-based catalyst support/catalyst crystal lattice is obtained.

In one embodiment, a surfactant is used when the solid catalyst component is formed. A surfactant may contribute to the beneficial properties of the solid catalyst component and the catalyst system. General examples of surfactants include polymer surfactants, such as polyacrylates, polymethacrylates, polyalkyl methacrylates, and the like. A polyalkyl methacrylate is a polymer contains one or more than one methacrylate monomer, such as at least two different methacrylate monomers, at least three different methacrylate monomers, and so on. The acrylate and methacrylate polymers can contain monomers other than acrylate and methacrylate monomers, as long as the polymer surfactant contains at least about 40% by weight of acrylate and methacrylate monomers.

In one embodiment, nonionic surfactants and/or anionic surfactants can be used. Examples of nonionic surfactants and/or anionic surfactants include, but are not limited to, phosphate esters, alkyl sulfonates, aryl sulfonates, alkylaryl sulfonates, linear alkyl benzene sulfonates, alkylphenols, ethoxylated alcohols, carboxylic esters, fatty alcohols, fatty esters, fatty aldehydes, fatty ketones, fatty acid nitriles, benzene, naphthalene, anthracene, succinic anhydride, phthalic anhydrides, rosin, terpene, phenol, or the like. In some instances, anhydride surfactants are effective. The absence of an anhydride surfactant can lead to the formation of very small catalyst support particles, while the using excess anhydride surfactant can lead to a needle shaped material.

A solid catalyst precursor can be formed as follows. In a solvent such as toluene, a magnesium and titanium-containing solution results from the addition of a halogenating agent, such as $TiCl_4$, into a magnesium-based solution at relatively cool temperatures, such as about $-25°$ C. to about $0°$ C. An oil phase then forms, that can be dispersed into the hydrocarbon phase and is stable up to about $40°$ C. The resultant magnesium material becomes a semi-solid, and particle morphology is determined. The semi-solid converts to a solid between about $40°$ C. and about $80°$ C.

To facilitate obtaining uniform solid particles, the precipitation process is performed slowly. When the second method of adding titanium halide dropwise at low or room temperature is applied, the process may take place over a period from about 1 hour to about 6 hours. When the first method of raising the temperature in a slow manner is applied, the rate of temperature increase can range from about $4°$ C. to about $12.5°$ C. per hour.

The solid precipitate first is separated from the mixture. A variety of complexes and byproducts may be entrained in the resulting solid precipitate, such that further treatment may be necessary. In one embodiment, the solid precipitate is treated with a titanium compound to substantially remove byproducts from the solid precipitate.

The solid precipitate can be washed with an inert diluent, then treated with a titanium compound or a mixture of a titanium compound and an inert diluent. The titanium compound used in this treatment can be identical to or different from the titanium compound used to form the solid precipitate. The amount of titanium compound used is from about 1 to about 20 moles, such as from about 2 to about 15 moles, per mole of magnesium compound in the support. The treatment temperature ranges from about $50°$ C. to about $150°$ C., such as from about $60°$ C. to about $100°$ C. If a mixture of titanium tetrahalide and an inert diluent is used to treat the solid precipitate, the volume % of titanium tetrahalide in the treating solution is from about 10% to about 100%, the rest being inert diluent.

The treated solids can be further washed with an inert diluent to remove ineffective titanium compounds and other byproducts. The inert diluent can be hexane, heptanes, octane, 1,2-dichloroethane, benzene, toluene, ethylbenzene, xylene, and other hydrocarbons.

By treating the solid precipitate with the titanium compound and optionally an inert diluent, the byproducts in the solid precipitate can be removed from the solid precipitate. In one embodiment, the solid precipitate is treated with the titanium compound and optionally an inert diluent two to about five times.

By treating the solid precipitate with an inert diluent, soluble titanium compounds in the solid precipitate can be removed from the solid precipitate. The resultant solid precipitate therefore is substantially free of soluble titanium compounds. In one embodiment, the solid precipitate is treated repeatedly with an inert diluent until the filtrate contains about 100 ppm or less of titanium. In another embodiment, the solid precipitate is treated repeatedly with an inert diluent until the filtrate contains about 50 ppm or less of titanium. In yet another embodiment, the solid precipitate is treated with an inert diluent until the filtrate contains about 10 ppm or less of titanium. In one embodiment, the solid precipitate is treated with an inert diluent about three times to seven times.

In one embodiment, the solid catalyst component contains about 0.5 to about 6 wt % titanium; about 10 to about 25 wt % magnesium; about 40 to about 70 wt % halogen; about 1 to about 50 wt % internal electron donors A and B in total; and optionally inert diluent from 0 to about 15 wt %. In another embodiment, the solid catalyst component contains about 2 to about 25 wt % of internal electron donors A and B in total. In yet another embodiment, the solid catalyst component contains about 5 to about 20 wt % of internal electron donors A and B in total.

The relative amount of donor A to donor B in the solid catalyst component can vary from about 5% to about 95% of donor A and from about 5% to about 95% of donor B, based on the total amount of internal electron donors in the solid catalyst component.

The amounts of the ingredients used in preparing the solid catalyst component can vary depending upon the method of preparation. In one embodiment, from about 0.01 to about 5 moles of the internal electron donor compounds in total (including donors A and B and any additional internal electron donors), and from about 0.01 to about 500 moles of the titanium compounds are used per mole of the magnesium compound used to make the solid catalyst component. In another embodiment, from about 0.05 to about 2 moles of the internal electron donor compounds in total and from about 0.05 to about 300 moles of the titanium compounds are used per mole of the magnesium compound used to make the solid catalyst component.

In one embodiment, in the solid catalyst component, the atomic ratio of halogen/titanium is from about 4 to about 200; the internal electron donor in total/titanium mole ratio is from about 0.01 to about 10; and the magnesium/titanium atomic ratio is from about 1 to about 100. In another embodiment, in the solid catalyst component, the atomic ratio of halogen/titanium is from about 5 to about 100; the internal electron donor in total/titanium mole ratio is from about 0.2 to about 6; and the magnesium/titanium atomic ratio is from about 2 to about 50.

The resulting solid catalyst component generally contains a magnesium halide of a smaller crystal size than commercial magnesium halides and usually has a specific surface area of at least about 5 $m^2$/g, such as from about 10 to about 1,000 $m^2$/g, or from about 100 to about 800 $m^2$/g. Because the above ingredients are unified to form an integral structure of the solid catalyst component, the composition of the solid catalyst component is not substantially changed by being washed, for example, with hexane.

The solid catalyst component may be used after being mixed with an inorganic or organic compound, such as a silicon compound, an aluminum compound, or the like.

Methods of preparing solid catalyst components also are described in U.S. Pat. Nos. 4,771,023; 4,784,983; 4,829,038; 4,861,847; 4,990,479; 5,177,043; 5,194,531; 5,244,989; 5,438,110; 5,489,634; 5,576,259; 5,767,215; 5,773,537; 5,905,050; 6,323,152; 6,437,061; 6,469,112; 6,962,889; 7,135,531; 7,153,803; 7,271,119; and U.S. Patent Publication Nos. 2004/242406; 2004/0242407; and 2007/0021573, each incorporated herein by reference in its entirety.

The catalyst system can contain at least one organoaluminum compound in addition to the solid catalyst component. Compounds having at least one aluminum-carbon bond in the molecule can be used as the organoaluminum compound. Examples of organoaluminum compounds include compounds of the following chemical formula:

$$AlR_nX_{3-n}$$

wherein R represents a hydrocarbon group, typically having 1 to about 20 carbon atoms, X represents a halogen atom, and $0 \leq n \leq 3$.

Examples of organoaluminum compounds include, but are not limited to, trialkyl aluminums, such as triethyl aluminum, tributyl aluminum and trihexyl aluminum; trialkenyl aluminums, such as triisoprenyl aluminum; dialkyl aluminum halides, such as diethyl aluminum chloride, dibutyl aluminum chloride, and diethyl aluminum bromide; alkyl aluminum sesquihalides, such as ethyl aluminum sesquichloride, butyl aluminum sesquichloride, and ethyl aluminum sesquibromide; alkyl aluminum dihalides such as ethyl aluminum dichloride, propyl aluminum dichloride, and butyl aluminum dibromide; dialkyl aluminum hydrides, such as diethyl aluminum hydride and dibutyl aluminum hydride; and other partially hydrogenated alkyl aluminums, such as ethyl aluminum dihydride and propyl aluminum dihydride.

The organoaluminum compound is used in a catalyst system of the present invention in an amount such that the mole ratio of aluminum to titanium (from the solid catalyst component) is about 5 to about 1,000. In another embodiment, the mole ratio of aluminum to titanium in the catalyst system is about 10 to about 700. In yet another embodiment, the mole ratio of aluminum to titanium in the catalyst system is about 25 to about 400.

The catalyst system also includes an external electron donor in addition to internal electron donors A and B. The external electron donor is one component of a catalyst system for olefin polymerization and contributes to controlling the molecular weight distribution and crystallinity of a polyolefin, while retaining high performance with respect to catalytic activity.

The catalyst system can contain at least one alkyl benzoate derivative as an external electron donor compound in addition to the solid catalyst component. The alkyl benzoate derivative is present in the catalyst system in an amount such that a mole ratio of the organoaluminum compound to the alkyl benzoate derivative is about 2 to about 80. In another embodiment, the mole ratio of the organoaluminum compound to the alkyl benzoate derivative is about 5 to about 70. In yet another embodiment, the mole ratio of the organoaluminum compound to the alkyl benzoate derivative is about 7 to about 50.

The alkyl benzoate derivative is represented by the chemical formula

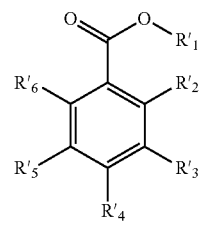

wherein $R'_1$ is $C_1$-$C_6$ linear or branched alkyl; and $R'_2$ through $R'_6$, independently, are hydrogen, halogen, $C_1$-$C_6$ linear or branched alkyl, or $C_1$-$C_6$ linear or branched alkoxyl radicals.

Examples of alkyl benzoate derivatives include, but are not limited to, methylbenzoate, ethylbenzoate, propylbenzoate, butylbenzoate, methyl-3-methylbenzoate, ethyl-3-methylbenozate, propyl-3-methylbenzoate, butyl-3-methylbenozate, methyl-4-methylbenzoate, ethyl-4-methylbenozate, propyl-4-methylbenzoate, butyl-4-methylbenozate, methyl-3-ethylbenzoate, ethyl-3-ethylbenozate, propyl-3-ethylbenzoate, butyl-3-ethylbenozate, methyl-4-ethylbenzoate, ethyl-4-ethylbenozate, propyl-4-ethylbenzoate, butyl-4-ethylbenozate, methyl-3-propylbenzoate, ethyl-3-propylbenozate, propyl-3-propylbenzoate, butyl-3-propylbenozate, methyl-4-propylbenzoate, ethyl-4-propylbenozate, propyl-4-propylbenzoate, butyl-4-propylbenozate, methyl-3-methoxybenzoate, ethyl-3-methoxybenozate, propyl-3-methoxybenozate, butyl-3-methoxybenozate, methyl-4-methoxybenzoate, ethyl-4-methoxybenozate, propyl-4-methoxybenozate, butyl-4-methoxybenozate, methyl-3-ethoxybenzoate, ethyl-3-ethoxybenozate, propyl-3-ethoxybenozate, butyl-3-ethoxybenozate, methyl-4-ethoxybenzoate, ethyl-4-ethoxybenozate, propyl-4-ethoxybenozate, butyl-4-ethoxybenozate, methyl-3-propoxybenzoate, ethyl-3-propoxybenozate, propyl-3-propoxybenozate, butyl-3-propoxybenozate, methyl-4-propoxybenozate, ethyl-4-propoxybenozate, propyl-4-propoxybenozate, butyl-4-propoxybenozate, methyl-3-chlorobenzoate, ethyl-3-chlorobenozate, propyl-3-chlorobenozate, butyl-3-chlorobenozate, methyl-4-chlorobenzoate, ethyl-4-chlorobenozate, propyl-4-chlorobenozate, butyl-4-chlorobenozate, methyl-3-bromobenzoate, ethyl-3-bromobenozate, propyl-3-bromobenozate, butyl-3-bromobenozate, methyl-4-bromobenzoate, ethyl-4-bromobenozate, propyl-4-bromobenozate, and butyl-4-bromobenozate.

The catalyst system also can contain an organosilicon compound as the external electron donor. The organosilicon compound contains silicon bonded to at least one hydrocarbon group. General examples of hydrocarbon groups include alkyl groups, cycloalkyl groups, (cycloalkyl)methylene groups, alkene groups, aromatic groups, and the like.

The organosilicon compound is used in the catalyst system in an amount such that a mole ratio of the organoaluminum compound to the organosilicon compound is about 2 to about 90. In another embodiment, the mole ratio of the organoaluminum compound to the organosilicon compound is about 5 to about 70. In yet another embodiment, the mole ration of the organoaluminum compound to the organosilicon compound is about 7 to about 35.

In one embodiment, the organosilicon compound is represented by chemical formula:

$$R_nSi(OR')_{4-n},$$

wherein each R and R' independently represent a hydrocarbon group, and n is $0 \leq n \leq 4$.

Examples of organosilicon compounds include, but are not limited to, trimethylmethoxysilane, trimethylethoxysilane, dimethyldimethoxysilane, dimethyldiethoxysilane, diisopropyldimethoxysilane, diisobutyldimethoxysilane, t-butylmethyldimethoxysilane, t-butylmethyldiethoxysilane, t-amylmethyldiethoxysilane, dicyclopentyldimethoxysilane, diphenyldimethoxysilane, phenylmethyldimethoxysilane, diphenyldiethoxysilane, bis-o-tolydimethoxysilane, bis-m-tolydimethoxysilane, bis-p-tolydimethoxysilane, bis-p-tolydiethoxysilane, bisethylphenyldimethoxysilane, dicyclohexyldimethoxysilane, cyclohexylmethyldimethoxysilane, cyclohexylmethyldiethoxysilane, ethyltrimethoxysilane, ethyltriethoxysilane, vinyltrimethoxysilane, methyltrimethoxysilane, n-propyltriethoxysilane, decyltrimethoxysilane, decyltriethoxysilane, phenyltrimethoxysilane, gamma-chloropropyltrimethoxysilane, methyltriethoxysilane, ethyltriethoxysilane, vinyltriethoxysilane, t-butyltriethoxysilane, n-butyltriethoxysilane, iso-butyltriethoxysilane, phenyltriethoxysilane, gamma-amniopropyltriethoxysilane, cholotriethoxysilane, ethyltriisopropoxysilane, vinyltirbutoxysilane, cyclohexyltrimethoxysilane, cyclohexyltriethoxysilane, 2-norbornanetrimethoxysilane, 2-norbornanetriethoxysilane, 2-norbornanemethyldimethoxysilane, ethyl silicate, butyl silicate, trimethylphenoxysilane, and methyltriallyloxysilane.

In another embodiment, the organosilicon compound is represented by the chemical formula:

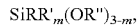

SiRR'$_m$(OR'')$_{3-m}$, wherein 0≦m≦3, such as 0≦m≦2; R represents a cyclic hydrocarbon or substituted cyclic hydrocarbon group; and R' and R'', identical or different, represent a hydrocarbon.

Examples of the group R include, but are not limited to, cyclopropyl; cyclobutyl; cyclopentyl; 2-methylcyclopentyl; 3-methylcyclopentyl; 2-ethylcyclopentyl; 3-propylcyclopentyl; 3-isopropylcyclopentyl; 3-butylcyclopentyl; 3-tertiary butyl cyclopentyl; 2,2-dimethylcyclopentyl; 2,3-dimethylcyclopentyl; 2,5-dimethylcyclopentyl; 2,2,5-trimethylcyclopentyl; 2,3,4,5-tetramethylcyclopentyl; 2,2,5,5-tetramethylcyclopentyl; 1-cyclopentylpropyl; 1-methyl-1-cyclopentylethyl; cyclopentenyl; 2-cyclopentenyl; 3-cyclopentenyl; 2-methyl-1-cyclopentenyl; 2-methyl-3-cyclopentenyl; 3-methyl-3-cyclopentenyl; 2-ethyl-3-cyclopentenyl; 2,2-dimethyl-3-cyclopentenyl; 2,5-dimethyl-3-cyclopentenyl; 2,3,4,5-tetramethyl-3-cyclopentenyl; 2,2,5,5-tetramethyl-3-cyclopentenyl; 1,3-cyclopentadienyl; 2,4-cyclopentadienyl; 1,4-cyclopentadienyl; 2-methyl-1,3-cyclopentadienyl; 2-methyl-2,4-cyclopentadienyl; 3-methyl-2,4-cyclopentadienyl; 2-ethyl-2,4-cyclopentadienyl; 2,2-dimethyl-2,4-cyclopentadienyl; 2,3-dimethyl-2,4-cyclopentadienyl; 2,5-dimethyl-2,4-cyclopentadienyl; 2,3,4,5-tetramethyl-2,4-cyclopentadienyl; indenyl; 2-methylindenyl; 2-ethylindenyl; 2-indenyl; 1-methyl-2-indenyl; 1,3-dimethyl-2-indenyl; indanyl; 2-methylindanyl; 2-indanyl; 1,3-dimethyl-2-indanyl; 4,5,6,7-tetrahydroindenyl; 4,5,6,7-tetrahydro-2-indenyl; 4,5,6,7-tetrahydro-1-methyl-2-indenyl; 4,5,6,7-tetrahydro-1,3-dimethyl-2-indenyl; fluorenyl groups; cyclohexyl; methylcyclohexyls; ethylcyclohexyls; propylcyclohexyls; isopropylcyclohexyls; n-butylcyclohexyls; tertiary-butyl cyclohexyls; dimethylcyclohexyls; and trimethylcyclohexyls.

Examples of R' and R'' are alkyl, cycloalkyl, aryl, alkylenearyl, and arylenealkyl groups having 3 or more carbon atoms. Furthermore, R and R' may be bridged by an alkylene group, etc. General examples of such organosilicon compounds are those wherein R is a cyclopentyl group, R' is an alkyl group, such as methyl or cyclopentyl group, and R'' is an alkyl group, particularly a methyl or ethyl group.

Examples of such organosilicon compounds include, but are not limited to, trialkoxysilanes such as cyclopropyltrimethoxysilane, cyclobutyltrimethoxysilane, cyclopentyltrimethoxysilane, 2-methylcyclopentyltrimethoxysilane, 2,3-dimethylcyclopentyltrimethoxysilane, 2,5-dimethylcyclopentyltrimethoxysilane, cyclopentyltriethoxysilane, cyclopentenyltrimethoxysilane, 3-cyclopentenyltrimethoxysilane, 2,4-cyclopentadienyltrimethoxysilane, indenyltrimethoxysilane and fluorenyltrimethoxysilane; dialkoxysilanes such as dicyclopentyldimethoxysilane, bis(2-methylcyclopentyl) dimethoxysilane, bis(3-tertiary butylcyclopentyl) dimethoxysilane, bis(2,3-dimethylcyclopentyl) dimethoxysilane, bis(2,5-dimethylcyclopentyl) dimethoxysilane, dicyclopentyldiethoxysilane, dicyclobutyldiethoxysilane, cyclopropylcyclobutyldiethoxysilane, dicyclopentenyldimethoxysilane, di(3-cyclopentenyl)dimethoxysilane, bis(2,5-dimethyl-3-cyclopentenyl)dimethoxysilane, di-2,4-cyclopentadienyl) dimethoxysilane, bis(2,5-dimethyl-2,4-cyclopentadienyl) dimethoxysilane, bis(1-methyl-1-cyclopentylethyl) dimethoxysilane, cyclopentylcyclopentenyldimethoxysilane, cyclopentylcyclopentadienyldimethoxysilane, diindenyldimethoxysilane, bis(1,3-dimethyl-2-indenyl)dimethoxysilane, cyclopentadienylindenyldimethoxysilane, difluorenyldimethoxysilane, cyclopentylfluorenyldimethoxysilane and indenylfluorenyldimethoxysilane; monoalkoxysilanes such as tricyclopentylmethoxysilane, tricyclopentenylmethoxysilane, tricyclopentadienylmethoxysilane, tricyclopentylethoxysilane, dicyclopentylmethylmethoxysilane, dicyclopentylethylmethoxysilane, dicyclopentylmethylethoxysilane, cyclopentyldimethylmethoxysilane, cyclopentyldiethylmethoxysilane, cyclopentyldimethylethoxysilane, bis(2,5-dimethylcyclopentyl)cyclopentylmethoxysilane, dicyclopentylcyclopentenylmethoxysilane, dicyclopentylcyclopentenadienylmethoxysilane and diindenylcyclopentylmethoxysilane; and ethylenebis-cyclopentyldimethoxysilane.

Polymerization of olefins in accordance with the present invention is performed in the presence of a catalyst system described above. Generally speaking, olefins are contacted with the catalyst system described above under suitable conditions to form desired polymer products. In one embodiment, a preliminary polymerization described below is carried out before the main polymerization. In another embodiment, polymerization is carried out without a preliminary polymerization. In yet another embodiment, the formation of copolymer is carried out using at least two polymerization zones.

In the preliminary polymerization, the solid catalyst component typically is employed in combination with at least a portion of the organoaluminum compound. This can be carried out in the presence of part or the whole of the alkyl benzoate derivative and/or the organosilicon compound (external electron donor compounds). The concentration of the catalyst system used in the preliminary polymerization may be much higher than that in the reaction system of the main polymerization.

In a preliminary polymerization, the concentration of the solid catalyst component in the preliminary polymerization is typically about 0.01 to about 200 millimoles, preferably about 0.05 to about 100 millimoles, calculated as titanium atoms per liter of an inert hydrocarbon medium described below. In one embodiment, the preliminary polymerization is carried out by adding an olefin and the above catalyst system ingredients to an inert hydrocarbon medium and polymerizing the olefin under mild conditions.

Examples of the inert hydrocarbon medium include, but are not limited to, aliphatic hydrocarbons, such as propane, butane, pentane, hexane, heptanes, octane, decane, dodecane, and kerosene; alicyclic hydrocarbons, such as cyclopentane, cyclohexane, and methylcyclopentane; aromatic hydrocarbons, such as benzene, toluene, and xylene; and mixtures thereof. In the present invention, a liquid olefin may be used in place of part or the whole of the inert hydrocarbon medium.

The olefin used in the preliminary polymerization can be the same as, or different from, an olefin used in the main polymerization.

The reaction temperature for the preliminary polymerization is sufficient for the resulting preliminary polymer to not substantially dissolve in the inert hydrocarbon medium. In one embodiment, the temperature is about −20° C. to about 100° C. In another embodiment, the temperature is about −10° C. to about 80° C. In yet another embodiment, the temperature is about 0° C. to about 40° C.

Optionally, a molecular-weight controlling agent, such as hydrogen, can be used in the preliminary polymerization. The molecular weight controlling agent is used in such an amount such that the polymer obtained by the preliminary polymerization has an intrinsic viscosity, measured in decalin at 135° C., of at least about 0.2 dl/g, and preferably about 0.5 to about 10 dl/g.

In one embodiment, the preliminary polymerization is desirably performed such that about 0.1 g to about 1,000 g of a polymer is formed per gram of the solid catalyst component of the catalyst system. In another embodiment, the preliminary polymerization is desirably performed such that from about 0.3 g to about 500 g of a polymer is formed per gram of the solid catalyst component. If the amount of the polymer formed by the preliminary polymerization is too large, the efficiency of producing the olefin polymer in the main polymerization may decrease, and when the resulting olefin polymer is molded into a film or another article, fish eyes tend to occur in the molded article. The preliminary polymerization can be carried out batchwise or continuously.

After the preliminary polymerization, or without performing any preliminary polymerization, the main polymerization of an olefin is carried out in the presence of a present olefin polymerization catalyst system formed from the solid catalyst component, the organoaluminum compound, and the external electron donor compounds.

Examples of olefins that can be used in the main polymerization are alpha-olefins having 2 to 20 carbon atoms, such as ethylene, propylene, 1-butene, 4-methyl-1-pentene, 1-pentene, 1-octene, 1-hexene, 3-methyl-1-pentene, 3-methyl-1-butene, 1-decene, 1-tetradecene, 1-eicosene, and vinylcyclohexane. In the process of the present invention, alpha-olefins can be used individually or in any combination.

In one embodiment, propylene or 1-butene is homopolymerized, or a mixed olefin containing propylene or 1-butene as a main component is copolymerized. When the mixed olefin is used, the proportion of propylene or 1-butene as the main component is usually at least about 50 mole %, preferably at least about 70 mole %.

By performing the preliminary polymerization, the catalyst system in the main polymerization can be adjusted in the degree of activity. This adjustment tends to result in a powdery polymer having a high bulk density. Furthermore, when the preliminary polymerization is carried out, the particle shape of the resulting polymer becomes spherical, and in the case of slurry polymerization, the slurry attains excellent characteristics, while in the case of gas phase polymerization, the polymer seed bed attains excellent characteristics. Furthermore, in these embodiments, a polymer having a high stereoregularity index can be produced with a high catalytic efficiency by polymerizing an alpha-olefin having at least 3 carbon atoms. Accordingly, when producing the propylene copolymer, the resulting copolymer powder or the copolymer is easy to handle.

In the polymerization of these olefins, a polyunsaturated compound such as conjugated diene or non-conjugated diene can be used as a comonomer. In one embodiment, the comonomers include thermoplastic and elastomeric monomers. Examples of comonomers include styrene, butadiene, acrylonitrile, acrylamide, alpha-methyl styrene, chlorostyrene, vinyl toluene, divinyl benzene, diallyphthalate, alkyl methacrylates, and alkyl acrylates.

The main polymerization of an olefin is performed in the gaseous or liquid phase. In one embodiment, the main polymerization employs a catalyst system containing the solid catalyst component in an amount of about 0.001 to about 0.75 millimoles calculated as Ti atom per liter of the volume of the polymerization zone, and the organoaluminum compound in an amount from of 1 to about 2,000 moles and the external electron donor in an amount of about 0.001 to about 10 moles per mole of titanium atoms in the solid catalyst component. In another embodiment, the main polymerization employs a catalyst system containing the solid catalyst component in an amount of 0.005 to about 0.5 millimoles calculated as Ti atom per liter of the volume of the polymerization zone, and the organoaluminum compound in an amount of about 5 to about 500 moles and the external electron donor in an amount of about 0.01 to about 2 moles per mole of titanium atoms in the solid catalyst component. In yet another embodiment, the main polymerization employs a catalyst system containing the external electron donor in an amount of about 0.005 to about 1 mole per mole of titanium atoms in the solid catalyst component. When the organoaluminum compound and the external electron donor are used partially in the preliminary polymerization, the catalyst system subjected to the preliminary polymerization is used together with the remainder of the catalyst system components. The catalyst system subjected to the preliminary polymerization may contain the preliminary polymerization product.

The use of hydrogen during polymerization promotes and contributes to control of the molecular weight of the resulting polymer, and the polymer obtained may have a high melt flow rate. In this case, the stereoregularity index of the resulting polymer and the activity of the catalyst system are increased according to the methods of the present invention.

In one embodiment, the polymerization temperature is about 20° C. to about 200° C. In another embodiment, the polymerization temperature is about 50° C. to about 180° C. In one embodiment, the polymerization pressure is typically from atmospheric pressure to about 100 kg/cm$^2$. In another embodiment, the polymerization pressure typically is about 2 kg/cm$^2$ to about 50 kg/cm$^2$. The main polymerization can be carried out batchwise, semi-continuously, or continuously. The polymerization also can be carried out in two or more stages under different reaction conditions.

The olefin polymer so obtained may be a homopolymer, a random copolymer, a block copolymer, or an impact copolymer. The impact copolymer contains an intimate mixture of a polyolefin homopolymer and a polyolefin rubber. Examples of polyolefin rubbers include ethylene propylene rubber (EPR), such as ethylene propylene methylene copolymer rubber (EPM) and ethylene propylene diene methylene terpolymer rubber (EPDM).

The olefin polymer obtained by using the catalyst system has a very small amount of an amorphous polymer component, and therefore a small amount of a hydrocarbon-soluble component. Accordingly, a film molded from the resultant polymer has low surface tackiness.

The polyolefin obtained by the polymerization process is excellent in particle size distribution, particle diameter, and bulk density, and the copolyolefin obtained has a broad molecular weight distribution. In an impact copolymer, excellent fluidity, low temperature resistance, and a desired balance between stiffness and elasticity can be obtained.

In one embodiment, propylene and an alpha-olefin having 2 or 4 to about 20 carbon atoms are copolymerized in the presence of the catalyst system described above. The catalyst system may be one subjected to the preliminary polymerization described above. In another embodiment, propylene and an ethylene rubber are formed in two reactors coupled in series to form an impact polymer.

The alpha-olefin having 2 carbon atoms is ethylene, and examples of the alpha-olefin having about 4 to 20 carbon atoms are 1-butene, 1-pentene, 4-methyl-1-pentene, 1-octene, 1-hexene, 3-methyl-1-pentene, 3-methyl-1-butene, 1-decene, vinylcyclohexane, 1-tetradecene, and the like.

In the main polymerization, propylene can be copolymerized with two or more such alpha-olefins. For example, it is possible to copolymerize propylene with ethylene and 1-butene. In one embodiment, propylene is copolymerized with ethylene, 1-butene, or ethylene and 1-butene.

Block copolymerization of propylene and another alpha-olefin can be carried out in two stages. The polymerization in a first stage may be the homopolymerization of propylene or the copolymerization of propylene with the other alpha-olefin. In one embodiment, the amount of the monomers polymerized in the first stage is about 50 to about 95% by weight. In another embodiment, the amount of the monomers polymerized in the first stage is about 60 to about 90% by weight. In the present invention, this first stage polymerization may, as required be carried out in two or more stages under the same or different polymerization conditions.

In one embodiment, the polymerization in a second stage is desirably carried out such that the mole ratio of propylene to the other alpha-olefin(s) is about 10/90 to about 90/10. In another embodiment, the polymerization in a second stage is desirably carried out such that the mole ratio of propylene to the other alpha-olefin(s) is about 20/80 to about 80/20. In yet another embodiment, the polymerization in a second stage is desirably carried out such that the mole ratio of propylene to the other alpha-olefin(s) is about 30/70 to about 70/30. Producing a crystalline polymer or copolymer of another alpha-olefin may be provided in the second polymerization stage.

The propylene copolymer so obtained may be a random copolymer or the above-described block copolymer. This propylene copolymer typically contains about 7 to about 50 mole % of units derived from the alpha-olefin having 2 or 4 to about 20 carbon atoms. In one embodiment, a propylene random copolymer contains from about 7 to about 20 mole % of units derived from the alpha-olefin having 2 or 4 to about 20 carbon atoms. In another embodiment, the propylene block copolymer contains about 10 to about 50 mole % of units derived from the alpha-olefin having 2 or 4-20 carbon atoms.

In another embodiment, copolymers made with the catalyst system contain about 50% to about 99% by weight poly-alpha-olefins and about 1% to about 50% by weight comonomers (such as thermoplastic or elastomeric monomers). In another embodiment, copolymers made with the catalyst system contain about 75% to about 98% by weight poly-alpha-olefins and about 2% to about 25% by weight comonomers.

It should be understood that where there is no reference to the polyunsaturated compound that can be used, the method of polymerization, the amount of the catalyst system and the polymerization conditions, the same description as the above embodiment are applicable.

The catalysts/methods of the present invention can be in some instances lead to the production of poly-alpha-olefins having xylene soluble (XS) from about 0.5% to about 5%. In another embodiment, poly-alpha-olefins having xylene soluble (XS) from about 1.5% to about 5% are produced in accordance with the present invention. Typically, the poly-alpha-olefin has an XS of about 2% to about 4%. XS refers to the percent of solid polymer that dissolves into xylene. A low XS % value generally corresponds to a highly isotactic polymer (i.e., higher crystallinity), whereas a high XS % value generally corresponds to a low isotactic polymer.

In one embodiment, the catalyst efficiency or CE (measured as kilogram of polymer produced per gram of catalyst) of the catalyst system of the present invention is at least about 30. In another embodiment, the catalyst efficiency of the catalyst system of the present invention is at least about 60.

The catalysts/methods of the present invention can in some instances lead to the production of poly-alpha-olefins having melt flow rates (MFR) from about 0.1 to about 300 in dg/min. The MFR is measured according to ASTM standard D1238. In another embodiment, poly-alpha-olefins having an MFR from about 0.5 to about 50 are produced in accordance with the present invention. In one embodiment, an impact polypropylene-ethylenepropylene rubber product has an MFR from about 0.75 to about 20. In another embodiment, an impact polypropylene-ethylenepropylene rubber product has an MFR from about 0.80 to about 10. In some instances, a relatively high MFR indicates relatively a high catalyst efficiency is obtainable.

The catalysts/methods of the present invention can in some instances lead to the production of poly-alpha-olefins having bulk densities (BD) of at least about 0.3 cc/g. In another embodiment, poly-alpha-olefins having a BD of at least about 0.4 cc/g are produced in accordance with the present invention.

In one embodiment, an impact polypropylene-ethylenepropylene rubber product having a BD of at least about 0.3 cc/g is produced in accordance with the present invention. In another embodiment, an impact polypropylene-ethylenepropylene rubber product having a BD of at least about 0.4 cc/g is produced in accordance with the present invention.

The catalysts/methods of the present invention lead to the production of poly-alpha-olefins having a relatively broad molecular weight distribution. In one embodiment, the Mw/Mn (PI) of a polypropylene polymer made with the catalyst system is from about 4 to about 6. In another embodiment, the Mw/Mn of a polypropylene polymer made with the catalyst system is from about 5 to about 6.

The present invention can lead to the production of a propylene block copolymer and impact copolymers including polypropylene based impact copolymer having one or more excellent melt-flowability, moldability desirable balance between rigidity and elasticity, good stereospecific control, good control over polymer particle size, shape, size distribution, and broad molecular weight distribution, and impact strength with a high catalytic efficiency and/or good operability. Employing the catalyst systems containing the solid catalyst component according to the present invention yields catalysts simultaneously having high catalytic efficiency, and one or more of excellent melt-flowability, extrudability, moldability, rigidity-elasticity and impact strength.

Examples of systems for polymerizing olefins are now described. Referring to FIG. 1, a high level schematic diagram of a system 10 for polymerizing olefins is shown. Inlet 12 is used to introduce into a reactor 14 catalyst system components, olefins, optional comonomers, hydrogen gas, fluid media, pH adjusters, surfactants, and any other additives. Although only one inlet is shown, many often are employed. Reactor 14 is any suitable vehicle in which olefins can be polymerized. Examples of reactor 14 include a single reactor, a series of two or more reactors, slurry reactors, fixed bed reactors, gas phase reactors, fluidized gas reactors, loop reactors, multizone circulating reactors, and the like. Once polymerization is complete, or as polyolefins are produced, the polymer product is removed from the reactor 14 via outlet 16 which leads to a collector 18. Collector 18 may include downstream processing, such as heating, extrusion, molding, and the like.

Figure 2:
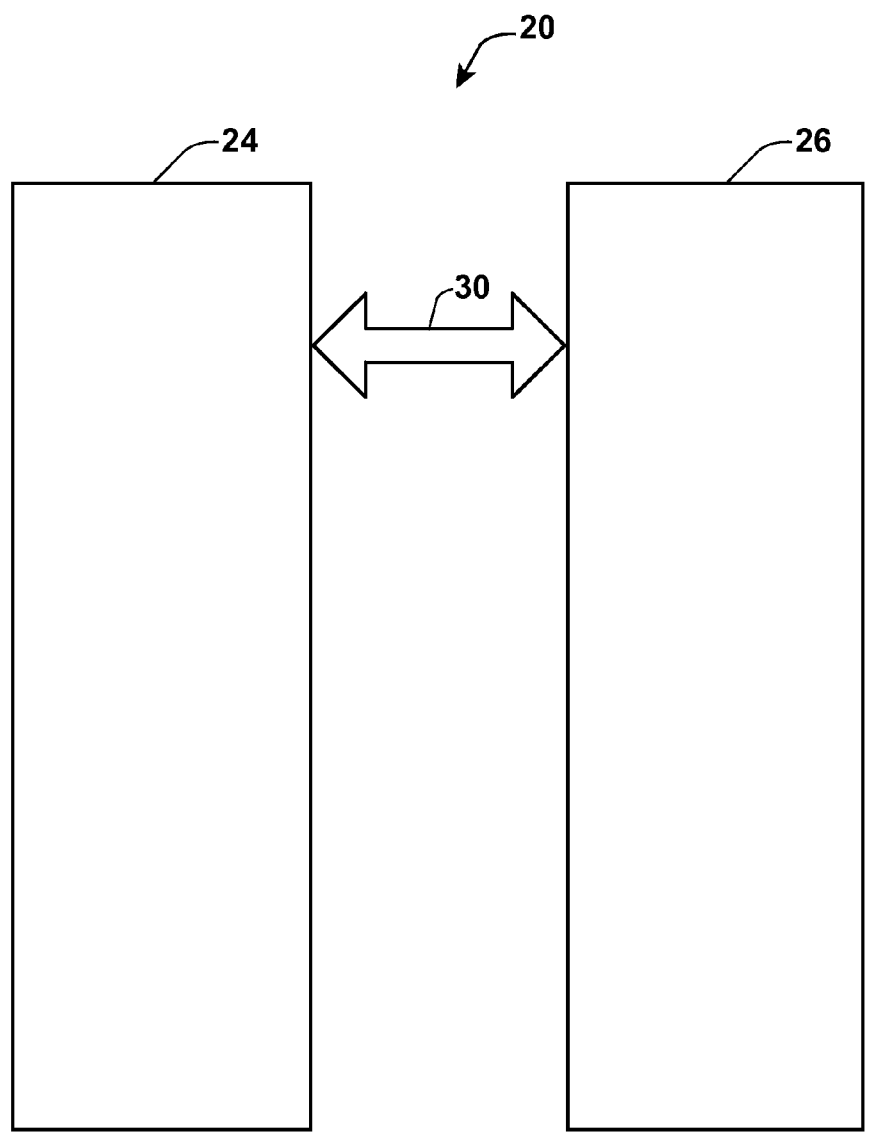
FIG. 2 is a schematic of an olefin polymerization reactor in accordance with another aspect of the present invention.
Figure 3:
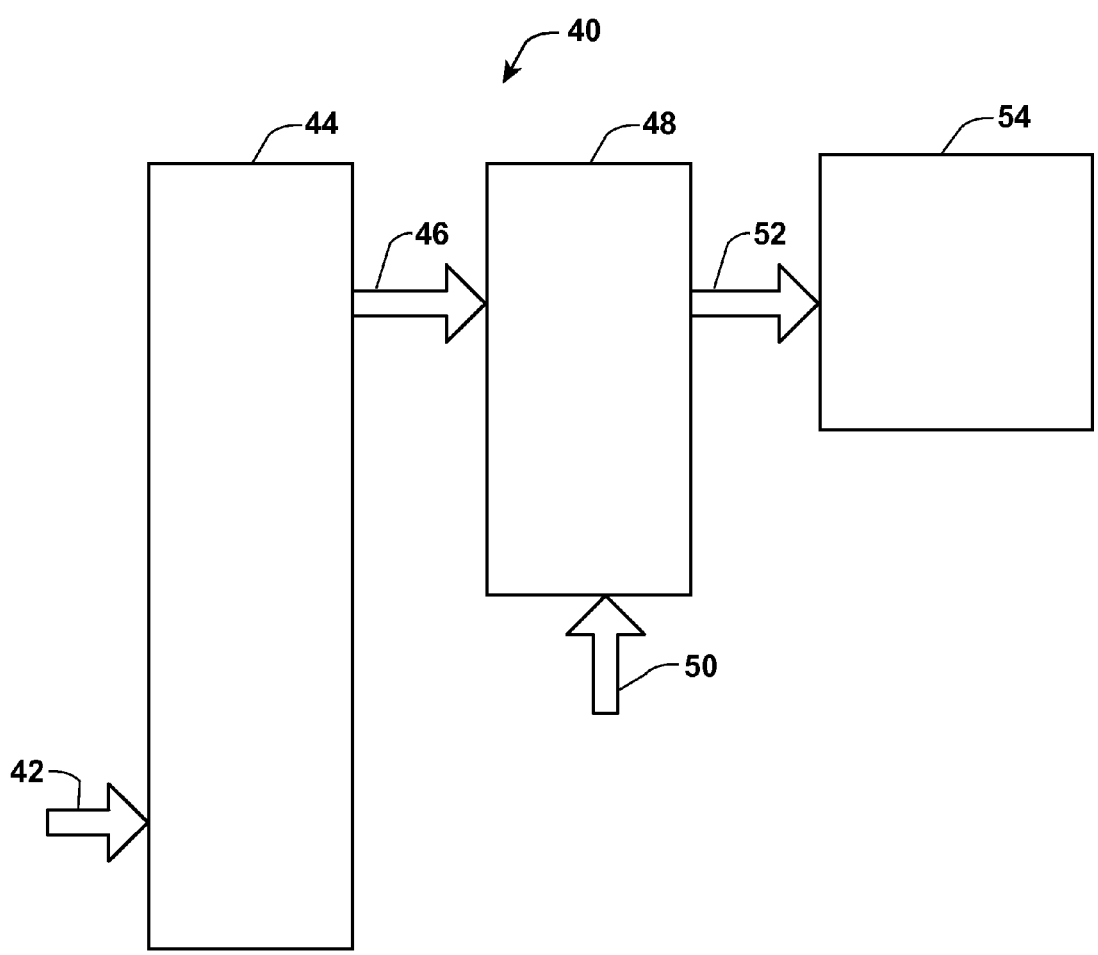
FIG. 3 is a schematic of a system for making an impact copolymer in accordance with an aspect of the present invention.

Referring to FIG. 2, a schematic diagram of a multizone circulating reactor 20 that can be employed as the reactor 14 in FIG. 1 or the reactor 44 in FIG. 3 for making polyolefins is shown. The multizone circulating reactor 20 substitutes a series of separate reactors with a single reactor loop that permits different gas phase polymerization conditions in two sides due to use of a liquid barrier. In the multizone circulating reactor 20, a first zone starts out rich in olefin monomers, and optionally one or more comonomers. A second zone is rich in hydrogen gas, and a high velocity gas flow divides the growing resin particles out loosely. The two zones produce resins of different molecular weights and/or monomer compositions. Polymer granules grow as they circulate around the loop, building up alternating layers of each polymer fraction in an onion like fashion. Each polymer particle constitutes an intimate combination of both polymer fractions.

In operation, the polymer particles pass up through the fluidizing gas in an ascending side 24 of the loop and come down through the liquid monomer on a descending side 26. The same or different monomers (and again optionally one or more comonomers) can be added in the two reactor legs. The catalyst system described above is used in the reactor.

In the liquid/gas separation zone 30, hydrogen gas is removed to cool and recirculate. Polymer granules are then packed into the top of the descending side 26, where they then descend. Monomers are introduced as liquids in this section. Conditions in the top of the descending side 26 can be varied with different combinations and/or proportions of monomers in successive passes.

Referring to FIG. 3, a high level schematic diagram of another system 40 for polymerizing olefins is shown. This system is ideally suited to make impact polymers. A reactor 44, such as a single reactor, a series of reactors, or a multizone circulating reactor is paired with a gas phase or a fluidized bed reactor 48 downstream containing the catalyst systems described above to make impact copolymers with desirable impact to stiffness balance or greater softness than made with conventional catalyst systems. Inlet 42 is used to introduce into the reactor 44 catalyst system components, olefins, optional comonomers, hydrogen gas, fluid media, pH adjusters, surfactants, and any other additives. Although only one inlet is shown, many often are employed. Through transfer means 46 the polyolefin made in the first reactor 44 is sent to a second reactor 48. Feed 50 is used to introduce catalyst system components, olefins, optional comonomers, fluid media, and any other additives. The second reactor 48 may or may not contain catalyst system components. Again, although only one inlet is shown, many often are employed.

Once the second polymerization is complete, or as impact copolymers are produced, the polymer product is removed from the second reactor 48 via outlet 52 which leads to a collector 54. Collector 54 may include downstream processing, such as heating, extrusion, molding, and the like. At least one of the first reactor 44 and the second reactor 48 contains catalyst systems in accordance with the invention.

When making an impact copolymer, polypropylene can be formed in the first reactor while an ethylene propylene rubber can be formed in the second reactor. In this polymerization, the ethylene propylene rubber in the second reactor is formed with the matrix (and particularly within the pores) of the polypropylene formed in the first reactor. Consequently, an intimate mixture of an impact copolymer is formed, wherein the polymer product appears as a single polymer product. Such an intimate mixture cannot be made by simply mixing a polypropylene product with an ethylene propylene rubber product.

Although not shown in any of the figures, the systems and reactors can be controlled, optionally with feedback based on continuous or intermittent testing, using a processor equipped with an optional memory and controllers. For example, a processor may be connected to one or more of the reactors, inlets, outlets, testing/measuring systems coupled with the reactors, and the like to monitor and/or control the polymerization process, based on preset data concerning the reactions, and/or based on testing/measuring data generated during a reaction. The controller may control valves, flow rates, the amounts of materials entering the systems, the conditions (e.g., temperature, reaction time, pH) of the reactions, and the like, as instructed by the processor. The processor may contain or be coupled to a memory that contains data concerning various aspects of the polymerization process.

With respect to any figure or numerical range for a given characteristic, a figure or a parameter from one range may be combined with another figure or a parameter from a different range for the same characteristic to generate a numerical range.

Other than in the operating examples, or where otherwise indicated, all numbers, values and/or expressions referring to quantities of ingredients, reaction conditions, used in the specification and claims are to be understood as modified in all instances by the term "about."

The following examples illustrate the present invention. Unless otherwise indicated in the following examples and elsewhere in the specification and claims, all parts and percentages are by weight, all temperatures are in ° C., and pressure is at or near atmospheric pressure.

The catalysts synthesis and testing procedures as well as the catalyst performance data, are provided in the following examples. In the following examples, the polydispersity index (PI) values measured on a rheometer instrument indicate the breadth of the molecular weight distribution provided by a catalysis system utilizing both an internal donor A and an internal donor B.

Example 1

Into a 250 ml Buchi reactor under $N_2$, a mixture of 3.3 g $MgCl_2$, 0.8 g phthalic anhydride, 50.92 g toluene, 6.41 g epichlorohydrin, and 6.70 g tributylphosphate was added. The mixture was heated for two hours while agitating at 400 rpm at 60° C. The reaction mixture then was cooled to −30° C., and 37.75 ml of $TiCl_4$, was added slowly while maintaining the reactor temperature below −26° C. After the addition, the agitation rate was reduced to 200 rpm and the temperature was ramped from −26° C. to 0° C. in one hour, then 0° C. to 85° C. in one hour.

The mixture was held at 85° C. for 30 minute, then 0.4 g of 1,8-naphthyl dibenzoate was added (mother liquor addition). The mixture was stirred at 85° C. for one hour, then filtered. The solids were resuspended in 38 ml of toluene and 0.15 g of 1-(9-(methoxymethyl)-9H-fluoren-9-yl)-propan-1-one was added to the reactor (toluene addition). The mixture was agitated for one hour at 85° C. and 200 rpm. After filtration and two washes with 65 ml toluene, the mixture was left overnight in toluene under $N_2$.

After filtering off the toluene, 66.25 ml of 10 vol % $TiCl_4$ in toluene was added, then heated to and held at 95° C. with 400 rpm agitation for one hour (1st activation addition). The solids were filtered, then re-suspended in 66.25 ml of 10 vol % $TiCl_4$, in toluene. The mixture was held at 110° C. for thirty minutes, after which the solids were again filtered (2nd activation). The final catalyst was washed four times with 65 ml of hexane, then discharged from the reactor in hexane.

Propylene polymerization was performed in a 3.4 liter autoclave. The autoclave was purged at 100° C. under nitrogen for one hour. At room temperature, 1.5 ml of 25 wt % triethylaluminum in hexane as an oxygen scavenger in heptanes was added into the autoclave. Then, 1.0 ml of 0.0768 M solution of cyclohexyl methyl dimethoxy silane, followed by 1 ml of 1 wt % catalyst slurry, were added into the autoclave. The autoclave was pressurized with $H_2$ as a chain transfer agent to 3.5 psig, then charged with 1500 ml propylene. The autoclave was heated to, then held at 70° C. for one hour. At the end of the hold, the autoclave was vented and the polymer was recovered.

Yield: 703 g polypropylene. Catalyst activity: 70.3 kg/g. Xylene soluble (XS): 3.2%. MFR: 0.8 dg/min, polydispersity index: 4.90.

Example 2

The catalyst was synthesized under the same conditions as Example 1, except the $2^{nd}$ activation was repeated one more time.

Propylene polymerization was the same as in Example 1. Yield: 692 g polypropylene. Catalyst activity: 69.2 kg/g. Xylene solubles: 3.11%. MFR: 1.1 dg/min, polydispersity index: 5.05.

Example 3

The catalyst was synthesized under the same conditions as Example 1, except 0.5 g of 1,8-naphthyl dibenzoate was added in the mother liquor addition and 0.20 g of 1-(9-(methoxymethyl)-9H-fluoren-9-yl)-propan-1-one was added in the toluene addition.

Propylene polymerization was the same as in Example 1. Yield: 652 g polypropylene. Catalyst activity: 65.2 kg/g. Xylene solubles: 3.17%. MFR: 0.9 dg/min, polydispersity index: 4.94.

Example 4

The catalyst was synthesized under the same conditions as Example 3, except the $2^{nd}$ activation was repeated one more time.

Propylene polymerization was the same as in Example 1. Yield: 688 g polypropylene. Catalyst activity: 68.8 kg/g. Xylene solubles: 3.07%. MFR: 0.9 dg/min, polydispersity index: 4.83.

Example 5

The catalyst was synthesized under the same conditions as Example 1, except 0.43 g of 1,8-naphthyl di-4-methylbenzoate was added in the mother liquor addition and 0.40 g of 1-(9-(methoxymethyl)-9H-fluoren-9-yl)-propan-1-one was added in the toluene addition.

Propylene polymerization was the same as in Example 1. Yield: 601 g polypropylene. Catalyst activity: 60.1 kg/g. Xylene solubles: 2.87%. MFR: 0.9 dg/min, polydispersity index: 5.15.

Example 6

The catalyst was synthesized under the same conditions as Example 5, except the $2^{nd}$ activation was repeated one more time.

Propylene polymerization was the same as in Example 1. Yield: 597 g polypropylene. Catalyst activity: 59.7 kg/g. Xytene solubles: 2.81%. MFR: 0.9 dg/min, polydispersity index: 5.17.

Example 7

The catalyst was synthesized under the same conditions as Example 1, except 0.40 g of 1-(9-(methoxymethyl)-9H-fluoren-9-yl)-8-methylnonan-1-one was added in the toluene addition.

Propylene polymerization was the same as in Example 1. Yield: 611 g polypropylene. Catalyst activity: 61.1 kg/g. Xylene solubles: 2.84%. MFR: 1.6 dg/min, polydispersity index: 4.83.

Example 8

The catalyst was synthesized under the same conditions as Example 7, except the $2^{nd}$ activation was repeated one more time.

Propylene polymerization was the same as in Example 1. Yield: 621 g polypropylene. Catalyst activity: 62.1 kg/g. Xylene solubles: 2.64%. MFR: 2.0 dg/min, polydispersity index: 4.67.

Example 9

The catalyst was synthesized under the same conditions as Example 3, except 0.50 g of 1-(9-(methoxymethyl)-9H-fluoren-9-yl)-8-methylnonan-1-one was added in the toluene addition.

Propylene polymerization was the same as in Example 1. Yield: 615 g polypropylene. Catalyst activity: 61.5 kg/g. Xylene solubles: 2.74%. MFR: 3.4 dg/min, polydispersity index: 4.75.

Example 10

The catalyst was synthesized under the same conditions as Example 9, except the $2^{nd}$ activation was repeated one more time.

Propylene polymerization was the same as in Example 1. Yield: 631 g polypropylene. Catalyst activity: 63.1 kg/g. Xylene solubles: 2.59%. MFR: 1.4 dg/min, polydispersity index: 4.60.

Example 11

The catalyst was synthesized under the same conditions as Example 10, except 0.5 g 1,8-naphthyl dibenzoate was added in the mother liquor addition and 0.5 g of 14(9-methoxymethyl)-9H-fluoren-9-yl)hexan-1-one was added in the toluene addition.

Propylene polymerization was the same as in Example 1, except 1.0 ml of 0.0768 M hexane solution of diisobutyl dimethoxy silane and 1.9 psig $H_2$ were added. Yield: 609 g polypropylene. Catalyst activity: 60.9 kg/g. Xylene solubles: 2.60%. MFR: 0.5 dg/min, polydispersity index: 4.49.

Example 12

Propylene polymerization was the same as in Example 11, except 11.0 psig $H_2$ were added. Yield: 669 g polypropylene. Catalyst activity: 66.9 kg/g. Xylene solubles: 2.76%. MFR: 0.8 dg/min, polydispersity index: 4.85.

Example 13

Propylene polymerization was the same as in Example 11, except 19.8 psig $H_2$ were added. Yield: 694 g polypropylene. Catalyst activity: 69.4 kg/g. Xylene solubles: 3.36%. MFR: 2.0 dg/min, polydispersity index: 5.25.

Example 14

Propylene polymerization was the same as in Example 11, except 44.0 psig $H_2$ were added. Yield: 750 g polypropylene. Catalyst activity: 75.0 kg/g. Xylene solubles: 3.72%. MFR: 20.8 g/min, polydispersity index: 5.62.

Example 15

Propylene polymerization was the same as in Example 11, except 1.0 ml of 0.0768 M hexane solution of cyclohexyl methyl dimethoxy silane was added. Yield: 561 g polypropylene. Catalyst activity: 56.1 kg/g. Xylene solubles: 2.54%. MFR: 1.2 dg/min, polydispersity index: 4.54.

Example 16

Propylene polymerization was the same as in Example 15, except 11.0 psig $H_2$ was added. Yield: 567 g polypropylene. Catalyst activity: 56.7 kg/g. Xylene solubles: 2.66%. MFR: 2.3 dg/min, polydispersity index: 4.85.

Example 17

Propylene polymerization was the same as in Example 15, except 19.8 psig $H_2$ was added. Yield: 694 g polypropylene. Catalyst activity: 69.4 kg/g. Xylene solubles: 3.36%. MFR: 2.0 dg/min, polydispersity index: 5.25.

Example 18

Propylene polymerization was the same as in Example 15, except 44.0 psig $H_2$ was added. Yield: 709 g polypropylene. Catalyst activity: 70.9 kg/g. Xylene solubles: 3.03%. MFR: 27.6 g/min, polydispersity index: 5.65.

Example 19

Propylene polymerization was the same as in Example 11, except 1.0 ml of 0.0768 M hexane solution of dicyclopentyl dimethoxy silane was added. Yield: 599 g polypropylene. Catalyst activity: 59.9 kg/g. Xylene solubles: 2.17%. MFR: 0.7 dg/min, polydispersity index: 4.49.

Example 20

Propylene polymerization was the same as in Example 19, except 11.0 psig $H_2$ was added. Yield: 631 g polypropylene. Catalyst activity: 63.1 kg/g. Xylene solubles: 2.39%. MFR: 1.6 dg/min, polydispersity index: 5.20.

Example 21

Propylene polymerization was the same as in Example 19, except 19.8 psig $H_2$ was added. Yield: 709 g polypropylene. Catalyst activity: 70.9 kg/g. Xylene solubles: 2.44%. MFR: 3.0 dg/min, polydispersity index: 5.25.

Example 22

Propylene polymerization was the same as in Example 19, except 44.0 psig $H_2$ was added. Yield: 714 g polypropylene. Catalyst activity: 71.4 kg/g. Xylene solubles: 2.76%. MFR: 19.6 g/min, polydispersity index: 5.66.

Example 23

Propylene polymerization was the same as in Example 11, except 1.0 ml of 0.0768 M hexane solution of diisopropyl dimethoxy silane was added. Yield: 613 g polypropylene. Catalyst activity: 61.3 kg/g. Xylene solubles: 2.42%. MFR: 0.9 dg/min, polydispersity index: 4.71.

Example 24

Propylene polymerization was the same as in Example 23, except 11.0 psig $H_2$ was added. Yield: 619 g polypropylene. Catalyst activity: 61.9 kg/g. Xylene solubles: 2.84%. MFR: 2.3 dg/min, polydispersity index: 5.09.

Example 25

Propylene polymerization was the same as in Example 23, except 19.8 psig $H_2$ was added. Yield: 720 g polypropylene. Catalyst activity: 72.0 kg/g. Xylene solubles: 3.02%. MFR: 5.7 dg/min, polydispersity index: 5.32.

Example 26

Propylene polymerization was the same as in Example 23, except 44.0 psig $H_2$ was added. Yield: 756 g polypropylene. Catalyst activity: 75.6 kg/g. Xylene solubles: 2.89%. MFR: 29.3 g/min, polydispersity index: 5.75.

Example 27

Propylene polymerization was the same as in Example 11, except 1.0 ml of 0.0768 M hexane solution of diethylamino triethoxy silane was added. Yield: 549 g polypropylene. Catalyst activity: 54.9 kg/g. Xylene solubles: 2.69%. MFR: 0.6 dg/min, polydispersity index: 4.70.

Example 28

Propylene polymerization was the same as in Example 27, except 11.0 psig $H_2$ was added. Yield: 620 g polypropylene. Catalyst activity: 62.0 kg/g. Xylene solubles: 2.77%. MFR: 2.0 dg/min, polydispersity index: 5.04.

Example 29

Propylene polymerization was the same as in Example 27, except 19.8 psig $H_2$ was added. Yield: 640 g polypropylene. Catalyst activity: 64.0 kg/g. Xylene solubles: 3.12%. MFR: 4.1 dg/min, polydispersity index: 5.38.

Example 30

Propylene polymerization was the same as in Example 27, except 44.0 psig $H_2$ was added. Yield: 732 g polypropylene. Catalyst activity: 73.2 kg/g. Xylene solubles: 3.58%. MFR: 75.3 g/min.

The disclosed information is intended to embrace all such alternations, modifications and variations that fall within the spirit and scope of the appended claims. Furthermore, to the extent that the term "includes," "has," "involve," or variants thereof is used in either the detailed description or the claims, such term is intended to be inclusive in a manner similar to the term "comprising" as "comprising" is interpreted when employed as a transitional word in a claim.

The invention claimed is:

1. A catalyst system for use in a polymerization of an olefin comprising:
   a) a solid catalyst component comprising:
      (i) a titanium halide;
      (ii) a magnesium halide;
      (iii) a first internal electron donor compound comprising at least one ether group and at least one ketone group; and
      (iv) a second electron donor compound having a 1,8-naphthyl diester structure;
   b) an organoaluminum compound; and
   c) an external electron donor compound.

2. The catalyst system of claim 1, wherein the first internal electron donor has a structure:

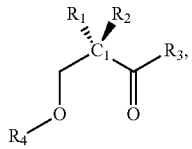

wherein $R_1$, $R_2$, $R_3$, and $R_4$, independently, represent a substituted or unsubstituted hydrocarbon group.

3. The catalyst system of claim 2, wherein $R_1$, $C_1$, and $R_2$ are taken together to form a 5- or 6-membered hydrocarbon ring or a fluorenyl structure.

4. The catalyst system of claim 2, wherein $R_3$ is linear or branched $C_1$-$C_{12}$ alkyl or $C_4$-$C_8$ alkylphenyl; and O—$R_4$ is $C_1$-$C_6$ alkoxy.

5. The catalyst system of claim 2, wherein $R_1$—$C_1$—$R_2$ are taken together to form fluorene, cyclopentane, cyclopentadiene, cyclohexane, cyclohexadiene, or a $C_5$-$C_{15}$ linear or branched alkyl group.

6. The catalyst system of claim 1, wherein the first internal electron donor is selected from the group consisting of 9-(alkylcarbonyl)-9-alkoxymethylfluorene, 9-(methylcarbonyl)-9-methoxymethylfluorene, 9-(methylcarbonyl)-9-ethoxymethylfluorene, 9-(methylcarbonyl)-9-propoxymethylfluorene, 9-(methylcarbonyl)-9-butoxymethylfluorene, 9-(methylcarbonyl)-9-pentoxymethylfluorene, 9-(ethylcarbonyl)-9-methoxymethylfluorene, 9-(ethylcarbonyl)-9-ethoxymethylfluorene, 9-(ethylcarbonyl)-9-propoxymethylfluorene, 9-(ethylcarbonyl)-9-butoxymethylfluorene, 9-(ethylcarbonyl)-9-pentoxymethylfluorene, 9-(propylcarbonyl)-9-methoxymethylfluorene, 9-(propylcarbonyl)-9-ethoxymethylfluorene, 9-(propylcarbonyl)-9-propoxymethylfluorene, 9-(propylcarbonyl)-9-butoxymethylfluorene, 9-(propylcarbonyl)-9-pentoxymethylfluorene, 9-(butylcarbonyl)-9-methoxymethylfluorene, 9-(butylcarbonyl)-9-ethoxymethylfluorene, 9-(butylcarbonyl)-9-propoxymethylfluorene, 9-(butylcarbonyl)-9-butoxymethylfluorene, 9-(butylcarbonyl)-9-pentoxymethylfluorene, 9-(isobutylcarbonyl)-9-methoxymethylfluorene, 9-(isobutylcarbonyl)-9-ethoxymethylfluorene, 9-(isobutylcarbonyl)-9-propoxymethylfluorene, 9-(isobutylcarbonyl)-9-butoxymethylfluorene, 9-(isobutylcarbonyl)-9-pentoxymethylfluorene, 9-(pentylcarbonyl)-9-methoxymethylfluorene, 9-(pentylcarbonyl)-9-ethoxymethylfluorene, 9-(pentylcarbonyl)-9-propoxymethylfluorene, 9-(pentylcarbonyl)-9-butoxymethylfluorene, 9-(pentylcarbonyl)-9-pentoxymethylfluorene, 9-(hexylcarbonyl)-9-methoxymethylfluorene, 9-(hexylcarbonyl)-9-ethoxymethylfluorene, 9-(hexylcarbonyl)-9-propoxymethylfluorene, 9-(hexylcarbonyl)-9-butoxymethylfluorene, 9-(hexylcarbonyl)-9-pentoxymethylfluorene, 9-(octylcarbonyl)-9-methoxymethylfluorene, 9-(octylcarbonyl)-9-ethoxymethylfluorene, 9-(octylcarbonyl)-9-propoxymethylfluorene, 9-(octylcarbonyl)-9-butoxymethylfluorene, 9-(octylcarbonyl)-9-pentoxymethylfluorene; 9-(i-octylcarbonyl)-9-methoxymethylfluorene, 9-(i-octylcarbonyl)-9-ethoxymethylfluorene, 9-(i-octylcarbonyl)-9-propoxymethylfluorene, 9-(i-octylcarbonyl)-9-butoxymethylfluorene, 9-(i-octylcarbonyl)-9-pentoxymethylfluorene, 9-(nonylcarbonyl)-9-methoxymethylfluorene, 9-(nonylcarbonyl)-9-ethoxymethylfluorene, 9-(nonylcarbonyl)-9-propoxymethylfluorene, 9-(nonylcarbonyl)-9-butoxymethylfluorene, 9-(nonylcarbonyl)-9-pentoxymethylfluorene; 9-(i-nonylcarbonyl)-9-methoxymethylfluorene, 9-(i-nonylcarbonyl)-9-ethoxymethylfluorene, 9-(i-nonylcarbonyl)-9-propoxymethylfluorene, 9-(i-nonylcarbonyl)-9-butoxymethylfluorene, 9-(i-nonylcarbonyl)-9-pentoxymethylfluorene, 9-(2-ethyl-hexylcarbonyl)-9-methoxymethylfluorene, 9-(2-ethyl-hexylcarbonyl)-9-ethoxymethylfluorene, 9-(2-ethyl-hexylcarbonyl)-9-propoxymethylfluorene, 9-(2-ethyl-hexylcarbonyl)-9-butoxymethylfluorene, 9-(2-ethyl-hexylcarbonyl)-9-pentoxymethylfluorene, 9-(phenylketone)-9-methoxymethylfluorene, 9-(phenylketone)-9-ethoxymethylfluorene, 9-(phenylketone)-9-propoxymethylfluorene, 9-(phenylketone)-9-butoxymethylfluorene, 9-(phenylketone)-9-pentoxymethylfluorene, 9-(4-methylphenylketone)-9-methoxymethylfluorene, 9-(3-methylphenylketone)-9-methoxymethylfluorene, 9-(2-methylphenylketone)-9-methoxymethylfluorene, 1-(ethylcarbonyl)-1-methoxymethylcyclopentane, 1-(propylcarbonyl)-1-methoxymethylcyclopentane, 1-(i-propylcarbonyl)-1-methoxymethylcyclopentane, 1-(butylcarbonyl)-1-methoxymethylcyclopentane, 1-(i-butylcarbonyl)-1-methoxymethylcyclopentane, 1-(pentylcarbonyl)-1-methoxymethylcyclopentane, 1-(1-pentylcarbonyl)-1-methoxymethylcyclopentane, 1-(neopentylcarbonyl)-1-methoxymethylcyclopentane, 1-(hexylcarbonyl)-1-methoxymethylcyclopentane, 1-(2-ethylhexylcarbonyl)-1-methoxymethylcyclopentane, 1-(octylcarbonyl)-1-methoxymethylcyclopentane, 1-(i-octylcarbonyl)-1-methoxymethylcyclopentane, 1-(nonylcarbonyl)-1-methoxymethylcyclopentane, 1-(i-nonylcarbonyl)-1-methoxymethylcyclopentane, 1-(ethylcarbonyl)-1-methoxymethyl-2-methylcyclopentane, 1-(propylcarbonyl)-1-methoxymethyl-2-methylcyclopentane, 1-(i-propylcarbonyl)-1-methoxymethyl-2-methyl-cyclopentane, 1-(butylcarbonyl)-1-methoxymethyl-2-methylcyclopentane, 1-(i-butylcarbonyl)-1-methoxymethyl-2-methylcyclopentane, 1-(pentylcarbonyl)-1-methoxymethyl-2-methylcyclopentane, 1-(i-pentylcarbonyl)-1-methoxymethyl-2-methylcyclopentane, 1-(neopentylcarbonyl)-1-methoxymethyl-2-methylcyclopentane, 1-(hexylcarbonyl)-1-methoxymethyl-2-methylcyclopentane, 1-(2-ethylhexylcarbonyl)-1-methoxymethyl-2-methyl cyclopentane, 1-(octylcarbonyl)-1-methoxymethyl-2-methyl cyclopentane, 1-(i-octylcarbonyl)-1-methoxymethyl-2-methyl cyclopentane, 1-(nonylcarbonyl)-1-methoxymethyl-2-methyl cyclopentane, 1-(1-nonylcarbonyl)-1-methoxymethyl-2-methylcyclopentane, 1-(ethylcarbonyl)-1-methoxymethyl-2,5-dimethylcyclopentane, 1-(propylcarbonyl)-1-methoxymethyl-2,5-dimethylcyclopentane, 1-(i-propylcarbonyl)-1-methoxymethyl-2,5-dimethyl-cyclopentane, 1-(butylcarbonyl)-1-methoxymethyl-2,5-di-cyclopentane, 1-(i-butylcarbonyl)-1-methoxymethyl-2,5-dimethylcyclopentane, 1-(pentylcarbonyl)-1-methoxymethyl-2,5-dimethylcyclopentane, 1-(i-pentylcarbonyl)-1-methoxymethyl-2,5-dimethylcyclopentane, 1-(neopentylcarbonyl)-1-methoxymethyl-2,5-dimethylcyclopentane, 1-(hexylcarbonyl)-1-methoxymethyl-2,5-dimethylcyclopentane, 1-(2-ethylhexylcarbonyl)-1-methoxymethyl-2,5-dimethyl cyclopentane, 1-(octylcarbonyl)-1-methoxymethyl-2,5-dimethyl cyclopentane, 1-(i-octylcarbonyl)-1-methoxymethyl-2,5-dimethyl cyclopentane, 1-(nonylcarbonyl)-1-methoxymethyl-2,5-dimethyl cyclopentane, 1-(i-nonylcarbonyl)-1-methoxymethyl-2,5-dimethyl cyclopentane, 1-(ethylcarbonyl)-1-methoxymethyl-2,4-cyclopentadiene, 1-(propylcarbonyl)-1-methoxymethyl-2,4-cyclopentadiene, 1-(i-propylcarbonyl)-1-methoxymethyl-2,4-cyclopentadiene, 1-(butylcarbonyl)-1-methoxymethyl-2,4-cyclopentadiene, 1-(i-butylcarbonyl)-1-methoxymethyl-2,4-cyclopentadiene, 1-(pentylcarbonyl)-1-methoxymethyl-2,4-cyclopentadiene, 1-(i-pentylcarbonyl)-1-methoxymethyl-2,4-cyclopentadiene, 1-(neopentylcarbonyl)-1-methoxymethyl-2,4-cyclopentadiene, 1-(hexylcarbonyl)-1-methoxymethyl-2,4-cyclopentadiene, 1-(2-ethylhexylcarbonyl)-1-methoxymethyl-2,4-cyclopentadiene, 1-(octylcarbonyl)-1-methoxymethyl-2,4-cyclopentadiene, 1-(i-octylcarbonyl)-1-methoxymethyl-2,4-cyclopentadiene, 1-(nonylcarbonyl)-1-methoxymethyl-2,4-cyclopentadiene, 1-(i-nonylcarbonyl)-1-methoxymethyl-2,4-cyclopentadiene, 1-(ethylcarbonyl)-1-methoxymethyl-2-methyl-2,4-cyclopentadiene, 1-(propylcarbonyl)-1-methoxymethyl-2-methyl-2,4-cyclopentadiene, 1-(i-propylcarbonyl)-1-methoxymethyl-2-methyl-2,4-cyclopentadiene, 1-(butylcarbonyl)-1-methoxymethyl-2-methyl-2,4-cyclopentadiene, 1-(i-butylcarbonyl)-1-methoxymethyl-2-methyl-2,4-cyclopentadiene, 1-(pentylcarbonyl)-1-methoxymethyl-2-methyl-2,4-cyclopentadiene, 1-(i-pentylcarbonyl)-1-methoxymethyl-2-methyl-2,4-cyclopentadiene, 1-(neopentylcarbonyl)-1-methoxymethyl-2-methyl-2,4-cyclopentadiene, 1-(hexylcarbonyl)-1-methoxymethyl-2-methyl-2,4-cyclopentadiene, 1-(2-ethylhexylcarbonyl)-1-methoxymethyl-2-methyl-2,4-cyclopentadiene, 1-(octylcarbonyl)-1-methoxymethyl-2-methyl-2,4-cyclopentadiene, 1-(i-octylcarbonyl)-1-methoxymethyl-2-methyl-2,4-cyclopentadiene, 1-(nonylcarbonyl)-1-methoxymethyl-2-methyl-2,4-cyclopentadiene, 1-(i-nonylcarbonyl)-1-methoxymethyl-2-methyl-2,4-cyclopentadiene, 1-(ethylcarbonyl)-1-methoxymethyl-2,5-dimethyl-2,4-cyclopentadiene, 1-(propylcarbonyl)-1-methoxymethyl-2,5-dimethyl-2,4-cyclopentadiene, 1-(i-propylcarbonyl)-1-methoxymethyl-2,5-dimethyl-2,4-cyclopentadiene, 1-(butylcarbonyl)-1-methoxymethyl-2,5-dimethyl-2,4-cyclopentadiene, 1-(i-butylcarbonyl)-1-methoxymethyl-2,5-dimethyl-2,4-cyclopentadiene, 1-(pentylcarbonyl)-1-methoxymethyl-2,5-dimethyl-2,4-cyclopentadiene, 1-(i-pentylcarbonyl)-1-methoxymethyl-2,5-dimethyl-2,4-cyclopentadiene, 1-(neopentylcarbonyl)-1-methoxymethyl-2,5-dimethyl-2,4-cyclopentadiene, 1-(hexylcarbonyl)-1-methoxymethyl-2,5-dimethyl-2,4-cyclopentadiene, 1-(2-ethylhexylcarbonyl)-1-methoxymethyl-2,5-dimethyl-2,4-cyclopentadiene, 1-(octylcarbonyl)-1-methoxymethyl-2,5-dimethyl-2,4-cyclopentadiene, 1-(i-octylcarbonyl)-1-methoxymethyl-2,5-dimethyl-2,4-cyclopentadiene, 1-(nonylcarbonyl)-1-methoxymethyl-2,5-dimethyl-2,4-cyclopentadiene, 1-(i-nonylcarbonyl)-1-methoxymethyl-2,5-dimethyl-2,4-cyclopentadiene, 1-(ethylcarbonyl)-1-methoxymethylcyclohexane, 1-(propylcarbonyl)-1-methoxymethylcyclohexane, 1-(i-propylcarbonyl)-1-methoxymethylcyclohexane, 1-(butylcarbonyl)-1-methoxymethylcyclohexyl, 1-(i-butylcarbonyl)-1-methoxymethylcyclohexane, 1-(pentylcarbonyl)-1-methoxymethylcyclohexane, 1-(i-pentylcarbonyl)-1-methoxymethylcyclohexane, 1-(neopentylcarbonyl)-1-methoxymethylcyclohexane, 1-(hexylcarbonyl)-1-methoxymethylcyclohexane, 1-(2-ethylhexylcarbonyl)-1-methoxymethylcyclohexane, 1-(octylcarbonyl)-1-methoxymethylcyclohexane, 1-(i-octylcarbonyl)-1-methoxymethylcyclohexane, 1-(nonylcarbonyl)-1-methoxymethylcyclohexane, 1-(ethylcarbonyl)-1-methoxymethyl-2-methylcyclohexane, 1-(propylcarbonyl)-1-methoxymethyl-2-methylcyclohexane, 1-(i-propanecarbonyl)-1-methoxymethyl-2-methylcyclohexane, 1-(butylcarbonyl)-1-methoxymethyl-2-methylcyclohexane, 1-(i-butylcarbonyl)-1-methoxymethyl-2-methylcyclohexane, 1-(pentylcarbonyl)-1-methoxymethyl-2-methylcyclohexane, 1-(i-pentylcarbonyl)-1-methoxymethyl-2-methylcyclohexane, 1-(neopentylcarbonyl)-1-methoxymethyl-2-methylcyclohexane, 1-(hexylcarbonyl)-1-methoxymethyl-2-methylcyclohexane, 1-(2-ethylhexylcarbonyl)-1-methoxymethyl-2-methylcyclohexane, 1-(octylcarbonyl)-1-methoxymethyl-2-methylcyclohexane, 1-(i-octylcarbonyl)-1-methoxymethyl-2-methylcyclohexane, 1-(i-nonylcarbonyl)-1-methoxymethyl-2-methyl cyclohexane, 1-(ethylcarbonyl)-1-methoxymethyl-2,6-dimethylcyclohexane, 1-(propylcarbonyl)-1-methoxymethyl-2,6-dimethylcyclohexane, 1-(i-propylcarbonyl)-1-methoxymethyl-2,6-dimethyl-cyclohexane, 1-(butylcarbonyl)-1-methoxymethyl-2,6-dimethyl-cyclohexane, 1-(i-butylcarbonyl)-1-methoxymethyl-2,6-dimethylcyclohexane, 1-(pentylcarbonyl)-1-methoxymethyl-2,6-dimethylcyclohexane, 1-(i-pentylcarbonyl)-1-methoxymethyl-2,6-dimethylcyclohexane, 1-(neopentylcarbonyl)-1-methoxymethyl-2,6-dimethylcyclohexane, 1-(hexylcarbonyl)-1-methoxymethyl-2,6-dimethylcyclohexane, 1-(2-ethylhexylcarbonyl)-1-methoxymethyl-2,6-dimethyl cyclohexane, 1-(octylcarbonyl)-1-methoxymethyl-2,6-dimethyl cyclohexane, 1-(i-octylcarbonyl)-1-methoxymethyl-2,6-dimethyl cyclohexane, 1-(i-nonylcarbonyl)-1-methoxymethyl-2,6-dimethyl cyclohexane, 2,5-dimethyl-3-ethylcarbonyl-3'-methoxymethylpentane, 2,5-dimethyl-3-propylcarbonyl-3'-methoxymethylpentane, 2,5-dimethyl-3-propylcarbonyl-3'-methoxymethylpentane, 2,5-dimethyl-3-butylcarbonyl-3'-methoxymethylpentane, 2,5-dimethyl-3-i-butylcarbonyl-1-methoxymethylcyclohexyl, 1-(ethylcarbonyl)-1-methoxymethyl-2,5-cyclohexadiene, 1-(propylcarbonyl)-1-methoxymethyl-2,5-cyclohexadiene, 1-(i-propylcarbonyl)-1-methoxymethyl-2,5-cyclohexadiene, 1-(butylcarbonyl)-1-methoxymethylcyclohexyl, 1-(i-butylcarbonyl)-1-methoxymethyl-2,5-cyclohexadiene, 1-(pentylcarbonyl)-1-methoxymethyl-2,5-cyclohexadiene, 1-(i-pentylcarbonyl)-1-methoxymethyl-2,5-cyclohexadiene, 1-(neopentylcarbonyl)-1-methoxymethyl-2,5-cyclohexadiene, 1-(hexylcarbonyl)-1-methoxymethyl-2,5-cyclohexadiene, 1-(2-ethylhexylcarbonyl)-1-methoxymethyl-2,5-cyclohexadiene, 1-(octylcarbonyl)-1-methoxymethyl-2,5-cyclohexadiene, 1-(i-octylcarbonyl)-1-methoxymethyl-2,5-cyclohexadiene, 1-(i-nonylcarbonyl)-1-methoxymethyl-2,5-cyclohexadiene, 1-(ethylcarbonyl)-1-methoxymethyl-2-methyl-2,5-cyclohexadiene, 1-(propylcarbonyl)-1-methoxymethyl-2-methyl-2,5-cyclohexadiene, 1-(i-propanecarbonyl)-1-methoxymethyl-2-methyl-2,5-cyclohexadiene, 1-(butylcarbonyl)-1-methoxymethyl-2-methyl-2,5-cyclohexadiene, 1-(i-butylcarbonyl)-1-methoxymethyl-2-methyl-2,5-cyclohexadiene, 1-(pentylcarbonyl)-1-methoxymethyl-2-methyl-2,5-cyclohexadiene, 1-(i-pentylcarbonyl)-1-methoxymethyl-2-methyl-2,5-cyclohexadiene, 1-(neopentylcarbonyl)-1-methoxymethyl-2-methyl-2,5-cyclohexadiene, 1-(hexylcarbonyl)-1-methoxymethyl-2-methyl-2,5-cyclohexadiene, 1-(2-ethylhexylcarbonyl)-1-methoxymethyl-2-methyl-2,5-cyclohexadiene, 1-(octylcarbonyl)-1-methoxymethyl-2-methyl-2,5-cyclohexadiene, 1-(i-octylcarbonyl)-1-methoxymethyl-2-methyl-2,5- cyclohexadiene, 1-(i-nonylcarbonyl)-1-methoxymethyl-2-methyl-2,5-cyclohexadiene, 1-(ethylcarbonyl)-1-methoxymethyl-2,6-dimethyl-2,5-cyclohexadiene, 1-(propylcarbonyl)-1-methoxymethyl-2,6-dimethyl-2,5-cyclohexadiene, 1-(i-propylcarbonyl)-1-methoxymethyl-2,6-dimethyl-2,5-cyclohexadiene, 1-(butylcarbonyl)-1-methoxymethyl-2,6-dimethyl-2,5-cyclohexadiene, 1-(i-butylcarbonyl)-1-methoxymethyl-2,6-dimethyl-2,5-cyclohexadiene, 1-(pentylcarbonyl)-1-methoxymethyl-2,6-dimethyl-2,5-cyclohexadiene, 1-(i-pentylcarbonyl)-1-methoxymethyl-2,6-dimethyl-2,5-cyclohexadiene, 1-(neopentylcarbonyl)-1-methoxymethyl-2,6-dimethyl-2,5-cyclohexadiene, 1-(hexylcarbonyl)-1-methoxymethyl-2,6-dimethyl-2,5-cyclohexadiene, 1-(2-ethylhexylcarbonyl)-1-methoxymethyl-2,6-dimethyl-2,5-cyclohexadiene, 1-(octylcarbonyl)-1-methoxymethyl-2,6-dimethyl-2,5-cyclohexadiene, 1-(i-octylcarbonyl)-1-methoxymethyl-2,6-dimethyl-2,5-cyclohexadiene, 1-(i-nonylcarbonyl)-1-methoxymethyl-2,6-dimethyl-2,5-cyclohexadiene, 2,5-dimethyl-3-ethylcarbonyl-3'-methoxymethylpentane, 2,5-dimethyl-3-propylcarbonyl-3'-methoxymethylpentane, 2,5-dimethyl-3-i-propylcarbonyl-3'-methoxymethylpentane, 2,5-dimethyl-3-butylcarbonyl-3'-methoxymethylpentane, 2,5-dimethyl-3-i-butylcarbonyl-1-methoxymethylcyclohexyl, 4-isopropyl-4-(methoxymethyl)-7-methyloctan-3-one, 5-isopropyl-5-(methoxymethyl)-2,8-dimethylnonan-4-one, 5-isopropyl-5-(methoxymethyl)-8-methylnonan-4-one, 6-isopropyl-6-(methoxymethyl)-9-methyldecan-5-one, 5-isopropyl-5-(methoxymethyl)-2-methylundecan-6-one, 5-isopropyl-5-(methoxymethyl)-2-methyldodecan-6-one, 5-isopropyl-5-(methoxymethyl)-2-methyltridecan-6-one, 4-isopentyl-4-(methoxymethyl)-7-methyloctan-3-one, 5-isopentyl-5-(methoxymethyl)-8-methylnonan-4-one, 6-isopentyl-6-(methoxymethyl)-9-methyldecan-5-one, 5-isopentyl-5-(methoxymethyl)-2-methylundecan-6-one, 5-isopentyl-5-(methoxymethyl)-2-methyldodecan-6-one, 5-isopentyl-5-(methoxymethyl)-2-methyltridecan-6-one, 4-isobutyl-4-(methoxymethyl)-6-methylheptan-3-one, 5-isobutyl-5-(methoxymethyl)-7-methyloctan-4-one, 4-isobutyl-4-(methoxymethyl)-7-methylnonan-5-one, 4-isobutyl-4-(methoxymethyl)-2-methyldecan-5-one, and 4-isobutyl-4-(methoxymethyl)-2-methylundecan-5-one, and mixtures thereof.

7. The catalyst system of claim 1, wherein the second internal electron donor has a structure:

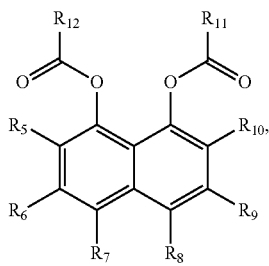

wherein $R_5$ through $R_{10}$, independently, are hydrogen, halogen, $C_1$-$C_6$ linear or branched alkyl, $C_6$-$C_{10}$ cycloalkyl, phenyl, $C_1$-$C_3$ alkylenearyl, arylene $C_1$-$C_6$ alkyl; and $R_{11}$ and $R_{12}$, independently, are $C_1$-$C_{20}$ linear or branched alkyl, $C_5$-$C_{10}$ cycloalkyl, $C_5$-$C_{10}$ cycloalkenyl, $C_5$-$C_{10}$ cycloalkadienyl, phenyl, $C_1$-$C_3$ alkylenearyl, or arylene $C_1$-$C_6$ alkyl.

8. The catalyst system of claim 1, wherein the second internal electron donor is selected from the group consisting of a naphthalene-1,8-diyl dicycloalkanecarboxylate derivative, a naphthalene-1,8-diyl dicycloalkenecarboxylate derivative, an 8-(cycloalkanecarbonyloxy)naphthalene-1-yl benzoate derivative, an 8-(cycloalkenecarbonyloxy)naphthalene-1-yl benzoate derivative, a 1,8-naphthyl diaryloate derivatives, and mixtures thereof.

9. The catalyst system of claim 1, wherein the second internal electron donor is selected from the group consisting of naphthalene-1,8-diyl dicyclohexanecarboxylate, naphthalene-1,8-diyl di-2-methylcyclohexanecarboxylate, naphthalene-1,8-diyl di-3-methylcyclohexanecarboxylate, and naphthalene-1,8-diyl di-4-methylcyclohexanecarboxylate, naphthalene-1,8-diyl dicyclohex-1-enecarboxylate, naphthalene-1,8-diyl dicyclohex-2-enecarboxylate, naphthalene-1,8-diyl dicyclohex-3-enecarboxylate, 8-(cyclohexanecarbonyloxy)naphthalene-1-yl benzoate, 8-(2-methylcyclohexanecarbonyloxy)naphthalene-1-yl benzoate, 8-(3-methylcyclohexanecarbonyloxy)naphthalene-1-yl benzoate, 8-(4-methylcyclohexanecarbonyloxy)naphthalene-1-yl benzoate, 8-(2-methylcyclohexanecarbonyloxy)naphthalene-1-yl 2-methylbenzoate, 8-(3-methylcyclohexanecarbonyloxy)naphthalene-1-yl 2-methylbenzoate, 8-(4-methylcyclohexanecarbonyloxy)naphthalene-1-yl 2-methylbenzoate, 8-(2-methylcyclohexanecarbonyloxy)naphthalene-1-yl 3-methylbenzoate, 8-(3-methylcyclohexanecarbonyloxy)naphthalene-1-yl 3-methylbenzoate, 8-(4-methylcyclohexanecarbonyloxy)naphthalene-1-yl 3-methylbenzoate, 8-(2-methylcyclohexanecarbonyloxy)naphthalene-1-yl 4-methylbenzoate, 8-(3-methylcyclohexanecarbonyloxy)naphthalene-1-yl 4-methylbenzoate, and 8-(4-methylcyclohexanecarbonyloxy)naphthalene-1-yl 4-methylbenzoate, 8-(cyclohex-1-enecarbonyloxy)naphthalene-1-yl benzoate, 8-(cyclohex-2-enecarbonyloxy)naphthalene-1-yl benzoate, 8-(cyclohex-3-enecarbonyloxy)naphthalene-1-yl benzoate, 8-(cyclohex-1-enecarbonyloxy)naphthalene-1-yl 2-methylbenzoate, 8-(cyclohex-2-enecarbonyloxy)naphthalene-1-yl 2-methylbenzoate, 8-(cyclohex-3-enecarbonyloxy)naphthalene-1-yl 2-methylbenzoate, 8-(cyclohex-1-enecarbonyloxy)naphthalene-1-yl 3-methylbenzoate, 8-(cyclohex-2-enecarbonyloxy)naphthalene-1-yl 3-methylbenzoate, 8-(cyclohex-3-enecarbonyloxy)naphthalene-1-yl 3-methylbenzoate, 8-(cyclohex-1-enecarbonyloxy)naphthalene-1-yl 4-methylbenzoate, 8-(cyclohex-2-enecarbonyloxy)naphthalene-1-yl 4-methylbenzoate, 8-(cyclohex-3-enecarbonyloxy)naphthalene-1-yl 4-methylbenzoate, 8-(2-methylcyclohex-1-enecarbonyloxy)naphthalene-1-yl benzoate, 8-(2-methylcyclohex-2-enecarbonyloxy)naphthalene-1-yl benzoate, 8-(2-methylcyclohex-3-enecarbonyloxy)naphthalene-1-yl benzoate, 8-(2-methylcyclohex-1-enecarbonyloxy)naphthalene-1-yl 2-methylbenzoate, 8-(2-methylcyclohex-2-enecarbonyloxy)naphthalene-1-yl 2-methylbenzoate, 8-(2-methylcyclohex-3-enecarbonyloxy)naphthalene-1-yl 2-methylbenzoate, 8-(2-methylcyclohex-1-enecarbonyloxy)naphthalene-1-yl 3-methylbenzoate, 8-(2-methylcyclohex-2-enecarbonyloxy)naphthalene-1-yl 3-methylbenzoate, 8-(2-methylcyclohex-3-enecarbonyloxy)naphthalene-1-yl 3-methylbenzoate, 8-(2-methylcyclohex-1-enecarbonyloxy)naphthalene-1-yl 4-methylbenzoate, 8-(2-methylcyclohex-2-enecarbonyloxy)naphthalene-1-yl 4-methylbenzoate, 8-(2-methylcyclohex-3-enecarbonyloxy)naphthalene-1-yl 4-methylbenzoate, 8-(3-methylcyclohex-1-enecarbonyloxy)naphthalene-1-yl benzoate, 8-(3-methylcyclohex-2-enecarbonyloxy)naphthalene-1-yl benzoate, 8-(3-methylcyclohex-3-enecarbonyloxy)naphthalene-1-yl benzoate, 8-(3-methylcyclohex-1-enecarbonyloxy)naphthalene-1-yl 2-methylbenzoate, 8-(3-methylcyclohex-2-enecarbonyloxy)naphthalene-1-yl 2-methylbenzoate, 8-(3-methylcyclohex-3-enecarbonyloxy)naphthalene-1-yl 2-methylbenzoate, 8-(3-methylcyclohex-1-enecarbonyloxy)naphthalene-1-yl 3-methylbenzoate, 8-(3-methylcyclohex-2-enecarbonyloxy)naphthalene-1-yl 3-methylbenzoate, 8-(3-methylcyclohex-3-enecarbonyloxy)

naphthalene-1-yl 3-methylbenzoate, 8-(3-methylcyclohex-1-enecarbonyloxy)naphthalene-1-yl 4-methylbenzoate, 8-(3-methylcyclohex-2-enecarbonyloxy)naphthalene-1-yl 4-methylbenzoate, 8-(3-methylcyclohex-3-enecarbonyloxy) naphthalene-1-yl 4-methylbenzoate, 8-(4-methylcyclohex-1-enecarbonyloxy)naphthalene-1-yl benzoate, 8-(4-methylcyclohex-2-enecarbonyloxy)naphthalene-1-yl benzoate, 8-(4-methylcyclohex-3-enecarbonyloxy)naphthalene-1-yl benzoate, 8-(4-methylcyclohex-1-enecarbonyloxy)naphthalene-1-yl 2-methylbenzoate, 8-(4-methylcyclohex-2-enecarbonyloxy)naphthalene-1-yl 2-methylbenzoate, 8-(4-methylcyclohex-3-enecarbonyloxy)naphthalene-1-yl 2-methylbenzoate, 8-(4-methylcyclohex-1-enecarbonyloxy) naphthalene-1-yl 3-methylbenzoate, 8-(4-methylcyclohex-2-enecarbonyloxy)naphthalene-1-yl 3-methylbenzoate, 8-(4-methylcyclohex-3-enecarbonyloxy)naphthalene-1-yl 3-methylbenzoate, 8-(4-methylcyclohex-1-enecarbonyloxy) naphthalene-1-yl 4-methylbenzoate, 8-(4-methylcyclohex-2-enecarbonyloxy)naphthalene-1-yl 4-methylbenzoate, 8-(4-methylcyclohex-3-enecarbonyloxy)naphthalene-1-yl 4-methylbenzoate, and mixtures thereof.

10. The catalyst system of claim 7, wherein the second internal electron donor has a structure:

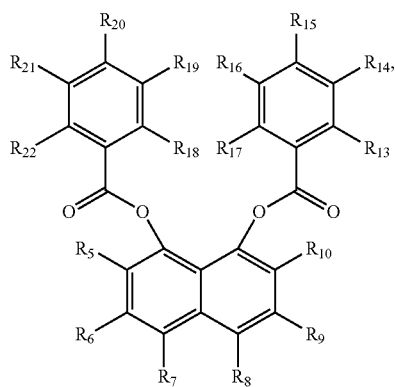

wherein $R_{13}$ through $R_{22}$, independently, are hydrogen, halogen, $C_1$-$C_6$ linear or branched alkyl, $C_5$-$C_{10}$ cycloalkyl, $C_1$-$C_6$ linear or branched alkoxyl, aryl, $C_7$-$C_{10}$ arylalkyl, $C_1$-$C_6$ alkylenearyl, or arylene $C_1$-$C_6$ alkyl.

11. The catalyst system of claim 10, wherein the second internal electron donor is selected from the group consisting of a 1,8-naphthyl di(alkylbenzoate), a 1,8-naphthyl di(dialkylbenzoate), a 1,8-naphthyl di(trialkylbenzoate), a 1,8-naphthyl di(arylbenzoate), a 1,8-naphthyl di(halobenzoate), a 1,8-napthyl di(dihalobenzoate), a 1,8-naphthyl di(alkylhalobenzoate), and mixtures thereof.

12. The catalyst system of claim 10, wherein the second internal electron donor is selected from the group consisting of 1,8-naphthyl dibenzoate; 1,8-naphthyl di-4-methylbenzoate; 1,8-naphthyl di-3-methylbenzoate; 1,8-naphthyl di-2-methylbenzoate; 1,8-naphthyl di-4-ethylbenzoate; 1,8-naphthyl di-4-n-propylbenzoate; 1,8-naphthyl di-4-isopropylbenzoate; 1,8-naphthyl di-4-n-butylbenzoate; 1,8-naphthyl di-4-isobutylbenzoate; 1,8-naphthyl di-4-t-butylbenzoate; 1,8-naphthyl di-4-phenylbenzoate; 1,8-naphthyl di-4-fluorobenzoate; 1,8-naphthyl di-3-fluorobenzoate; 1,8-naphthyl di-2-fluorobenzoate; 1,8-naphthyl di-4-chlorobenzoate; 1,8-naphthyl di-3-chlorobenzoate; 1,8-naphthyl di-2-chlorobenzoate; 1,8-naphthyl di-4-bromobenzoate; 1,8-naphthyl di-3-bromobenzoate; 1,8-naphthyl di-2-bromobenzoate; 1,8-naphthyl di-4-cyclohexylbenzoate; 1,8-naphthyl di-2,3-dimethylbenzoate; 1,8-naphthyl di-2,4-dimethylbenzoate; 1,8-naphthyl di-2,5-dimethylbenzoate; 1,8-naphthyl di-2,6-dimethylbenzoate; 1,8-naphthyl di-3,4-dimethylbenzoate; 1,8-naphthyl di-3,5-dimethylbenzoate; 1,8-naphthyl di-2,3-dichlorobenzoate; 1,8-naphthyl di-2,4-dichlorobenzoate; 1,8-naphthyl di-2,5-dichlorobenzoate; 1,8-naphthyl di-2,6-dichlorobenzoate; 1,8-naphthyl di-3,4-dichlorobenzoate; 1,8-naphthyl di-3,5-dichlorobenzoate; 1,8-naphthyl di-3,5-di-t-butylbenzoate; and mixtures thereof.

13. The catalyst system of claim 1, wherein the solid catalyst component further comprises one or more additional internal electron donor compound.

14. The catalyst system of claim 1, wherein the first internal electron donor compound and the second internal electron donor compound are supported on a magnesium halide crystal lattice.

15. The catalyst system of claim 1, wherein the titanium halide is $TiCl_4$ or $TiCl_3$.

16. The catalyst system of claim 1, wherein the titanium halide has a general formula $TiX_n(OR)_{4-n}$, wherein R is a hydrocarbon radical having 1 to about 20 carbon atoms, X is a halogen, and n is from 1 to 4.

17. The catalyst system of claim 1, wherein the external electron donor compound comprises an alkyl benzoate, an organosilicon compound, or both.

18. The catalyst system of claim 1, wherein the organoaluminum compound is an alkyl-aluminum compound.

19. The catalyst system of claim 18, wherein the organoaluminum compound is a trialkyl aluminum compound.

20. The catalyst system of claim 19, wherein the trialkyl aluminum compound is selected from the group consisting of triethylaluminum, triisobutylaluminum, tri-n-octylaluminum, and mixtures thereof.

21. A solid catalyst component for a polymerization of an olefin comprising
 (i) a titanium halide;
 (ii) a magnesium halide;
 (iii) a first internal electron donor compound comprising at least one ether group and at least one ketone group; and
 (iv) a second electron donor compound having a 1,8-naphthyl diester structure.

22. A process for polymerizing or copolymerizing an olefin comprising
 (i) providing a catalyst system of claim 1;
 (ii) polymerizing or copolymerizing the olefin in a presence of the catalyst system to form a polymer or a copolymer; and
 (iii) recovering the polymer or the copolymer.

23. The process of claim 22, wherein the olefin is selected from the group consisting of ethylene, propylene, 1-butylene, 4-methyl-1-pentente, 1-hexene, 1-octene, and mixtures thereof.

* * * * *

UNITED STATES PATENT AND TRADEMARK OFFICE
CERTIFICATE OF CORRECTION

PATENT NO.         : 8,227,370 B2                                    Page 1 of 1
APPLICATION NO.    : 12/943512
DATED              : July 24, 2012
INVENTOR(S)        : Chang It is certified that error appears in the above-identified patent and that said Letters Patent is hereby corrected as shown below:

In the Claims

Column 34, Line 39, in Claim 6, delete "1-(1-" and insert -- 1-(i- --, therefor.

Column 34, Line 60, in Claim 6, delete "1-(1-" and insert -- 1-(i- --, therefor.

Signed and Sealed this
Twenty-third Day of September, 2014

Michelle K. Lee
*Deputy Director of the United States Patent and Trademark Office*